United States Patent

Okajima et al.

[11] Patent Number: 6,158,819
[45] Date of Patent: Dec. 12, 2000

[54] BICYCLE WHEEL

[75] Inventors: Shinpei Okajima, Izumi; Tsutomu Muraoka, Sakai, both of Japan

[73] Assignee: Shimano Inc., Osaka, Japan

[21] Appl. No.: 09/027,293

[22] Filed: Feb. 20, 1998

Related U.S. Application Data

[63] Continuation-in-part of application No. 08/969,607, Nov. 13, 1997, Pat. No. 6,068,347.

[51] Int. Cl.⁷ ........................................ B60B 1/14
[52] U.S. Cl. ............................... 301/58; 301/104
[58] Field of Search .................. 301/55, 58, 59, 301/61, 110.5, 104

[56] References Cited

U.S. PATENT DOCUMENTS

| | | | |
|---|---|---|---|
| 783,095 | 2/1905 | Bohannon | 301/59 |
| 818,175 | 4/1906 | Howe et al. | 301/58 |
| 1,316,377 | 9/1919 | Medynski | 301/55 X |
| 1,421,128 | 6/1922 | Clark | 301/58 X |
| 1,431,208 | 10/1922 | Whitehead | 301/58 X |
| 5,540,485 | 7/1996 | Enders | 301/104 |
| 5,707,114 | 1/1998 | Schlanger | 301/58 |
| 5,882,088 | 3/1999 | Yahata | 301/59 X |

FOREIGN PATENT DOCUMENTS

| | | | |
|---|---|---|---|
| 259501 | 12/1985 | Japan | 301/58 |
| 12439 | 7/1892 | United Kingdom | 301/55 |
| 22458 | 10/1898 | United Kingdom | 301/55 |
| 16421 | 7/1913 | United Kingdom | 301/55 |
| 16421 | 1/1914 | United Kingdom | 301/55 |

*Primary Examiner*—Russell D. Stormer
*Attorney, Agent, or Firm*—Shinjyu Global IP Counselors, LLP

[57] ABSTRACT

A bicycle wheel basically has a hub, a plurality of spokes extending outwardly from the hub and an annular rim coupled to the outer ends of the spokes for supporting a tire. The annular rim has a spoke attachment portion with a plurality of openings for receiving the outer ends of the spokes therein. The outer ends of the spokes are bent such that first sections of the spokes are offset from sections of the spokes. These bends are positioned in the openings of the rims to retain the outer ends of the spokes in the openings of the rim. In selected embodiments, a fastener or an adhesive may be used to more securely retain the outer ends of the spokes in the openings of the rim. In certain other embodiments, the spoke attachment portion of the rim can be constructed of individually spaced elements which can be either fastened to the rim or unitary part of the rim.

55 Claims, 28 Drawing Sheets

(a)    (b)

BICYCLE WHEEL

CROSS-REFERENCES TO RELATED APPLICATIONS

This application is a continuation-in-part application of U.S. patent application Ser. No. 08/969,607, filed on Nov. 13, 1997 now U.S. Pat. No. 6,068,347. The entire disclosure of U.S. Pat. No. 6,068,347 is incorporated herein by reference.

BACKGROUND OF THE INVENTION

1. Field of the Invention

This invention generally relates to a bicycle wheel with a hub adapted to be mounted to a bicycle frame, an annular rim and a plurality of spokes extending inwardly from the rim to the hub. More specifically, the present invention relates to the connection between the spokes and the rim of the bicycle wheel.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles which has been extensively redesigned over the past years is the bicycle wheel. Bicycle wheels are constantly being redesigned to be lightweight and more aerodynamic in design as well as to be simple to manufacture and assemble.

There are many different types of bicycle wheels which are currently available on the market. The most basic bicycle wheels have a hub portion which is attached to a part of the frame of the bicycle for relative rotation, a plurality of spokes extending outwardly from the hub and an annular rim coupled to the outer ends of the spokes for supporting a pneumatic tire thereon. Typically, the spokes of the bicycle wheel were thin metal wire spokes. The ends of the hub are provided with a flange that is used to coupled the spokes thereto. In particular, holes are provided in the hub flanges. The wire spokes are usually bent on their inner end and provided with a flange that is formed in the shape of a nail head. The inner end is supported in one of the holes in one of the hub flanges. The outer end of the spokes typically are provided with threads for engaging spoke nipples which secure the outer ends of the wire spokes to the rim. In particular, the spoke nipples have flanges which engage the interior surface of the rim.

With a spoke constructed in this manner, the nipple is installed in a nipple hole formed in the rim, the spoke is inserted through the hole of the hub flange with the flange of the inner end of the spoke engaging the hole of the hub flange. The male threads on the outer ends of the spokes are threaded into the female threads of the spoke nipples installed in the openings of the rim.

SUMMARY OF THE INVENTION

One object of the present invention is to provide a bicycle wheel with a more aerodynamic design to reduce air resistance.

Another object of the present invention is to provide a bicycle wheel with fewer spokes extending between the rim and the hub.

Another object of the present invention is to provide a bicycle wheel which is lightweight in design.

The present invention can basically be obtained by a spoked rim assembly, comprising an annular rim having an outer annular surface adapted to receive a tire thereon, and a spoke attachment portion with at least one opening; at least one of inwardly extending spoke having an outer end portion at least partially received within the opening, a center portion located radially inwardly of the outer end portion, and an inner end portion located radially inwardly of the center portion, the outer end portion of the spoke having a first section offset from a second section to retain the outer end portion within the opening of the spoke attachment portion of the rim; and at least one fastener coupled between said rim and the spoke;

Also the foregoing objects can further be attained by providing a bicycle wheel, comprising an annular rim having an outer annular surface adapted to receive a tire thereon, and a spoke attachment portion with at least one opening; at least one inwardly extending spoke having an outer end portion received within the opening, a center portion located radially inwardly of the outer end portion, and an inner end portion located radially inwardly of the center portion, the outer end portion of the spoke having a first section offset from a second section to retain the outer end portion within the opening of the spoke attachment portion of the rim; at least one fastener coupled between said rim and said spoke; and a central hub having a spoke attachment part coupled to the inner end portion of the spoke.

The foregoing objects can further be attained by providing a bicycle rim, comprising: an outer annular surface adapted to receive a tire thereon and having a plurality of access openings formed therein; first and second annular spoke attachment portions coupled to the outer annular surface and located radially inwardly thereof, the first and second annular spoke attachment portions face in opposite directions with a plurality of spoke openings formed therein and a plurality of fastener openings positioned adjacent the spoke openings; and an inner annular surface coupling the first and second annular spoke attachment portions together, the outer annular surface, the first and second annular spoke attachment portions and the inner annular surface being integrally formed as a one-piece, unitary member with an annular hollow area, each of the plurality of spoke openings being a substantially elongated, thin slot extending in a substantially circumferential direction along the first and second annular spoke attachment portions, the plurality of spoke openings being located at least five millimeters radially outwardly from the inner annular surface, and having a radial width in the range of about 0.5 millimeters to about 5.0 millimeters.

In one embodiment of the present invention, the fastener used to connect the spoke to the rim is a rivet, while in a second embodiment, the fastener is a headed pin with a retaining ring. In addition to the fastener, an adhesive or cement may be utilized to further secure the outer end portion of the spoke to the rim.

The present invention can be utilized in either front or rear wheels, and can have any number of spokes as needed and/or desired.

Other objects, advantages and salient features of the invention will become apparent from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
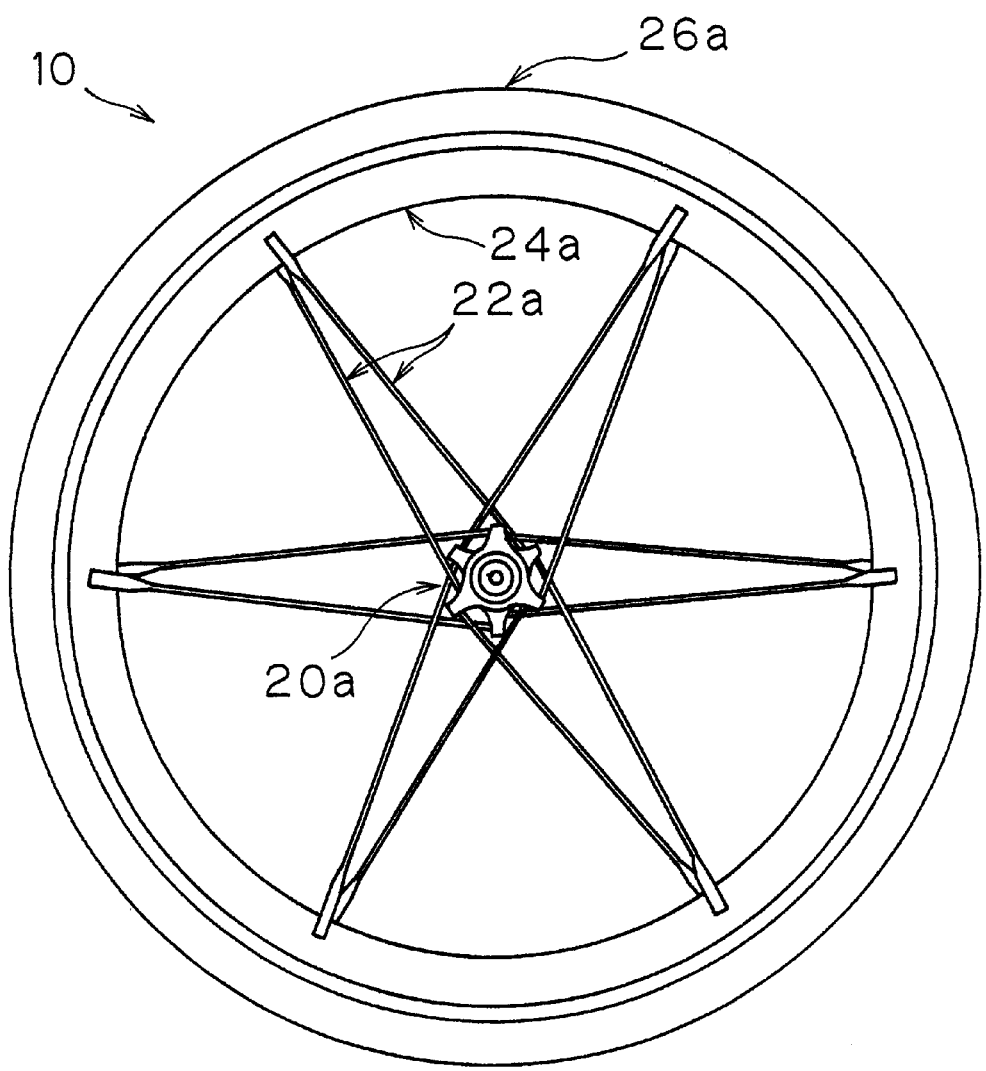
FIG. 1 is a side elevational view of a front bicycle wheel with a front hub, twelve spokes and a rim in accordance with a first embodiment of the present invention.
Figure 2:
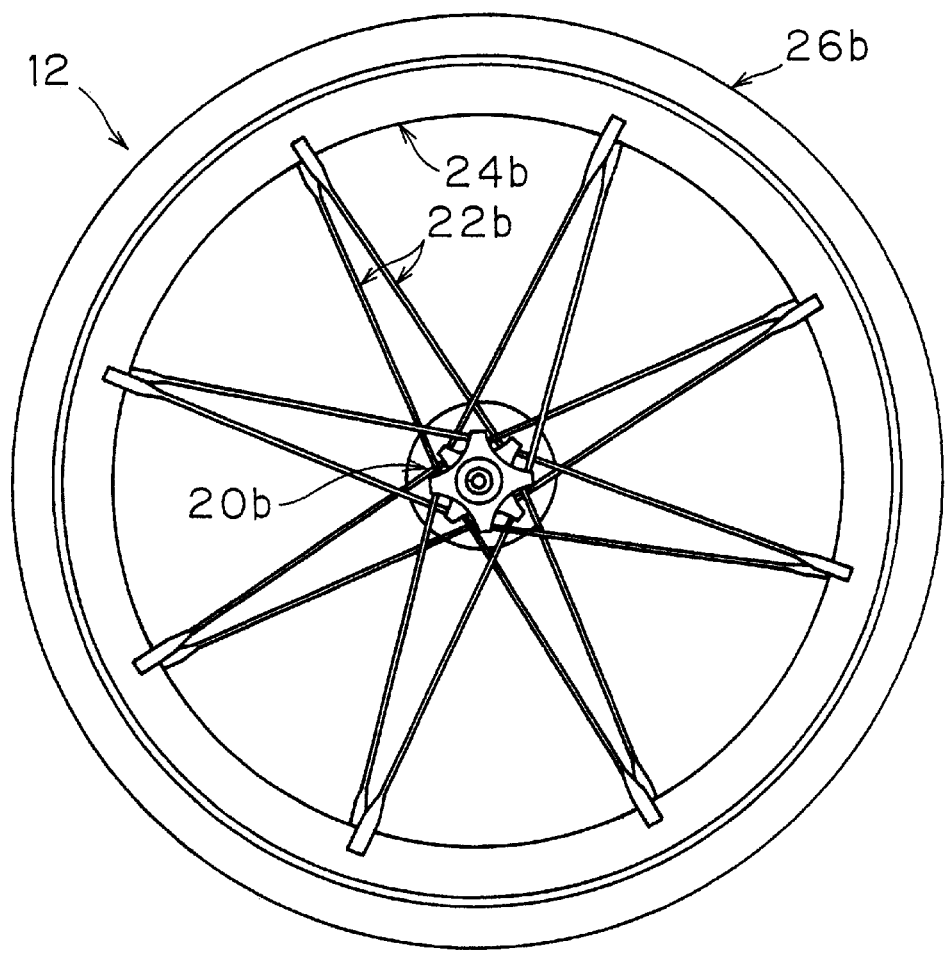
FIG. 2 is a side elevational view of a rear bicycle wheel with a rear hub, sixteen spokes and a rim in accordance with the first embodiment of the present invention.

Referring initially to FIGS. 1 and 2, a front bicycle wheel 10 in accordance with the present invention is illustrated in FIG. 1, and a rear bicycle wheel 12 in accordance with the present invention is illustrated in FIG. 2. Front wheel 10 has a central hub 20a, a plurality of outwardly extending spokes 22a and an annular rim 24a with a pneumatic tire 26a coupled thereto in a conventional manner. Similarly, rear bicycle wheel 12 has a rear hub 20b, a plurality of outwardly extending spokes 22b and an annular rim 24b with a pneumatic tire 26b coupled thereto in a conventional manner. Basically, the overall constructions of front bicycle wheel 10 and rear bicycle wheel 12 are substantially identical, except that rim and hub have been modified to accommodate a different number of spokes.

In the first embodiment shown herein, front bicycle wheel 10 has twelve spokes 22a, while rear bicycle wheel 12 has sixteen spokes 22b. Of course, it will be apparent to those skilled in the art from this disclosure that the front and rear wheels 10 and 12 can have the same number of spokes as well as fewer or more spokes than illustrated. In view of the similarities between front bicycle wheel 10 and rear bicycle wheel 12, only front bicycle wheel 10 will be discussed and illustrated in detail herein. Accordingly, it will be apparent to those skilled in the art from this disclosure that the description pertaining to the construction of front wheel 10 also applies to rear bicycle wheel 12.

Figure 3:
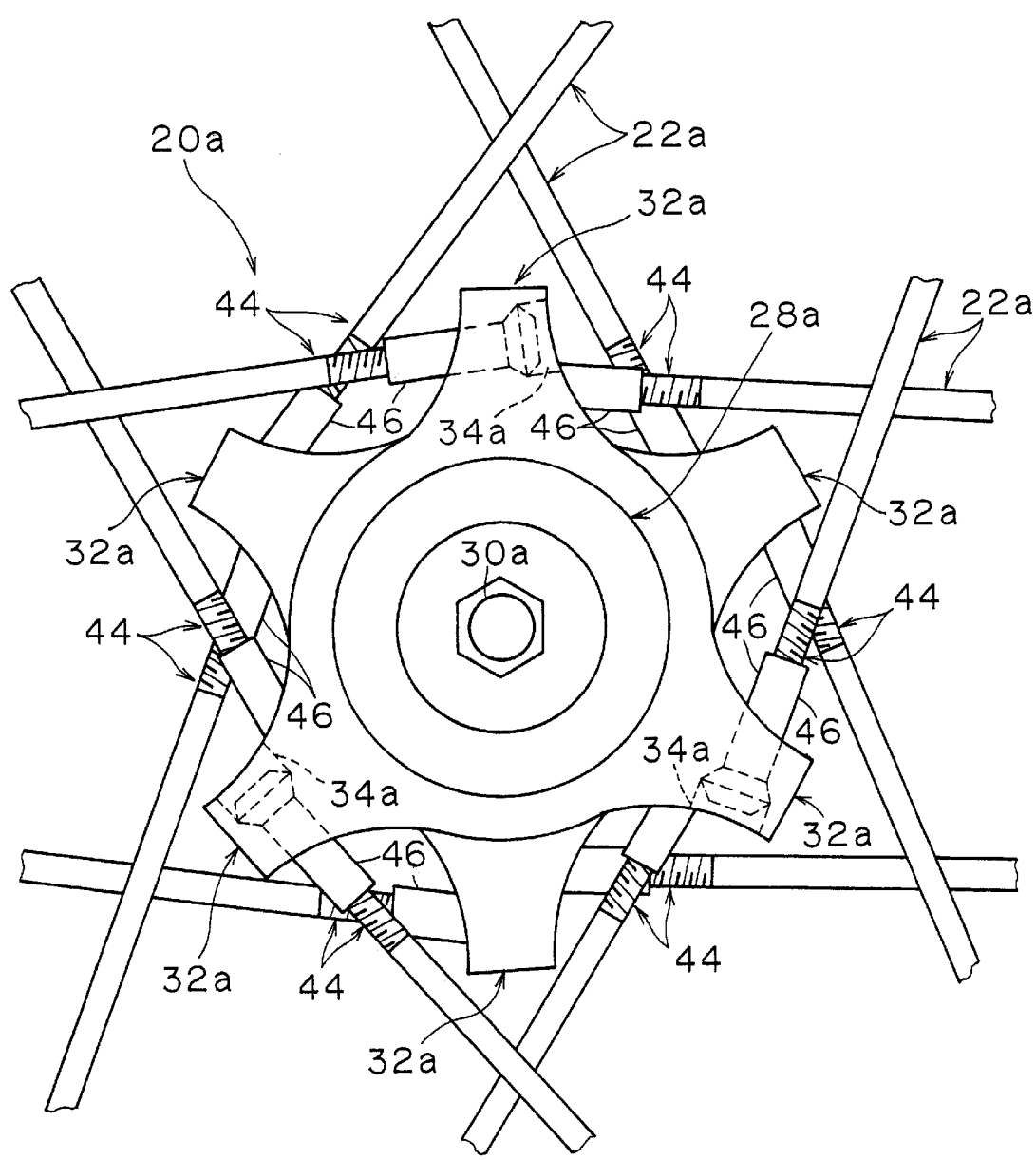
FIG. 3 is an enlarged elevational view of the front bicycle hub illustrated in FIG. 1 with the inner end portions of the spokes coupled thereto.

Referring now to FIG. 3, front hub 20a has a cylindrical hub shell 28a that is rotatably supported on a hub axle 30a in a substantially conventional manner. The hub shell 28a has a pair of flanges located at its opposite ends, with three outwardly extending spoke attachment parts 32a on each flange. Spoke attachment parts 32a are designed to receive two spokes 22a therein as explained below. In particular, each spoke attachment part 32a preferably has a pair of stepped bores or through holes 34a for coupling a pair of spokes 22a to each of the spoke attachment parts 32a. Of course, each of the spoke attachment parts 32a could have fewer/more spokes 22a coupled thereto as needed and/or desired. The number and shape of the spoke attachment parts will depend upon the number of spokes and their shapes. Accordingly, it will be apparent to those skilled in the art from this disclosure that other types and shapes of hubs can be utilized in connection with the present invention.

The particular constructions of hubs 20a and 20b and their connection to spokes 22a are disclosed and discussed in more detail in copending patent application Ser. No. 08/784,460, filed on Jan. 16, 1997 in the name of Yasuhiro Yahata and assigned to Shimano Inc. The disclosure of patent application Ser. No. 08/784,460 is hereby incorporated herein by reference to explain the precise construction of hubs 20a and 20b and their interconnection to spokes 22a and 22b.

Spokes 22a and 22b are preferably identical, and thus, only spokes 22a will be shown and discussed in detail herein. Spokes 22a are preferably constructed of a conventional metallic material utilized in construction of spokes, such as plated steel, stainless steel, aluminum or carbon fiber composite. Of course, it will be apparent to those skilled in the art from this disclosure that other suitable materials can be utilized as needed and/or desired.

Figure 6:
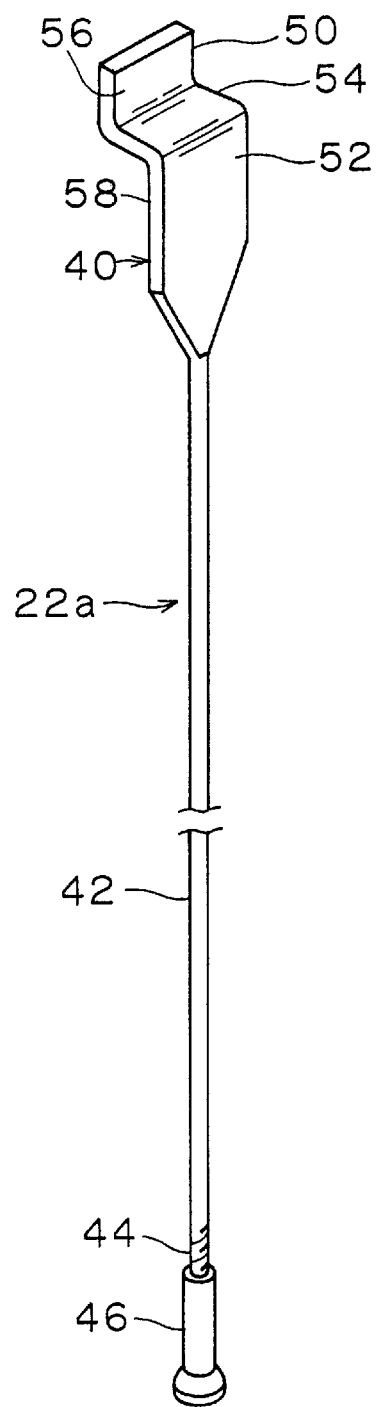
FIG. 6 is an enlarged perspective view of one of the spokes utilized in the bicycle wheels illustrated in FIGS. 1–5 in accordance with the first embodiment of the present invention.

As seen in FIG. 6, each of the spokes 22a has an outer end portion or spoke head 40 which is coupled to rim 24a, a straight center portion 42 located radially inwardly of outer end portion 40 and an inner end portion 44 located radially inwardly of the center portion 42 which is coupled to hub 20a. Preferably, outer end portion 40, center portion 42 and inner end portion 44 are constructed as a unitary, one-piece member with spoke nipples 46 theadedly coupled to the inner end portion 44 of each of the spokes 22a for connection to hub 20a. Spokes 22a extend from the left and right ends of the hub 20a towards the rim 24a. In other words, in a twelve spoke embodiment, six spokes extend substantially outwardly from the right end of hub 20a to rim 24a and six spokes extend substantially outwardly from the left end of hub 20a to rim 24a. Spokes 22a are preferably tangentially arranged relative to hub 20a as they extend outwardly therefrom. Of course, spokes 22a can be arranged in a more radial direction if needed and/or desired.

In the first embodiment, outer end portions 40 of spokes 22a have an elongated cross-section such as a rectangular cross-section, while center portions 42 and inner end portions 44 each have a circular cross-section. Of course, it will be apparent to those skilled in the art that the entire length of spokes 22a can be substantially uniform along its entire cross-section if needed and/or desired. It will also be apparent to those skilled in the art that constant cross-section spokes could utilize a variety of cross-sectional shapes as needed and/or desired. For example, spokes with an elliptical cross-section could be used in accordance with the present invention.

Figure 5:
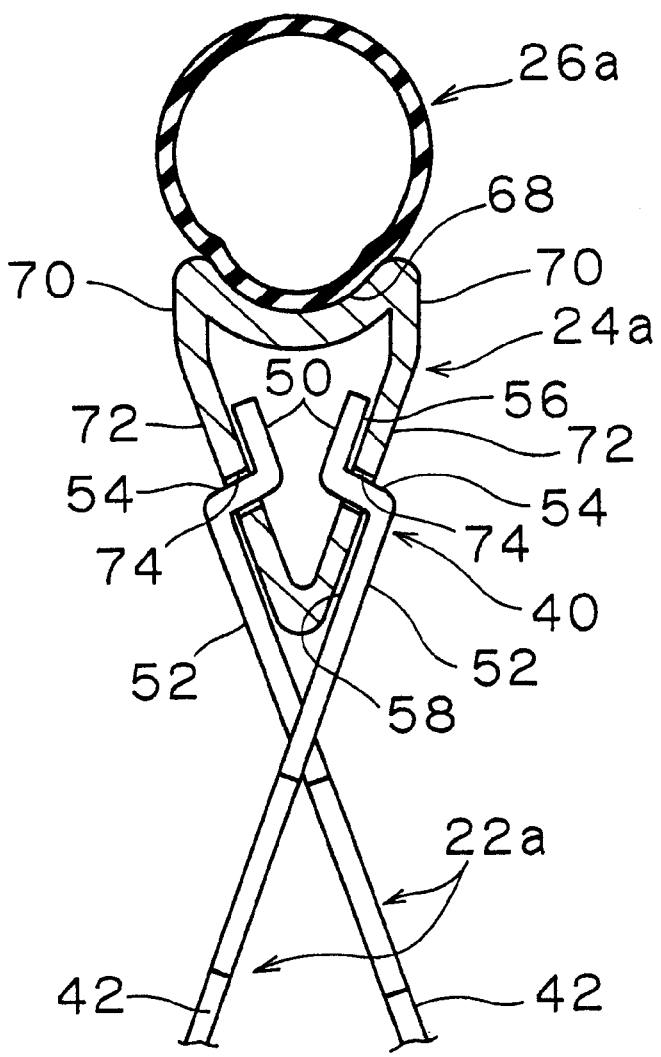
FIG. 5 is a partial, cross-sectional view of the rim as seen along section line 5—5 of FIG. 4 with two of the spokes of the bicycle wheel illustrated in FIGS. 1 and 4 shown in elevation.

As seen in FIGS. 5 and 6, outer end portions 40 of spokes 22a are bent to form first sections 50 at the free ends of spokes 22a which are offset from the second sections 52. This offsetting of the first and second section 50 and 52 forms a bend section 54 therebetween which retains the spoke 22a to rim 24a as discussed below. Preferably, second sections 52 of each spoke 22a lies substantially in the same plane as its respective center portion. First section 50, on the other hand, lies in a plane which is spaced from the plane of the second section 52 and preferably parallel thereto. Of course, it will be apparent to those skilled in the art from this disclosure that first section 50 can be bent or formed to have a different shape and/or cross-section than the illustrated shapes and cross-sections. In any event, the shapes and cross-sections of first section 50, second section 52 and bend section 54 of each spoke should be configured to prevent axial movement of the spoke relative to rim 24a when the spoke is in the installed position.

Figure 4:
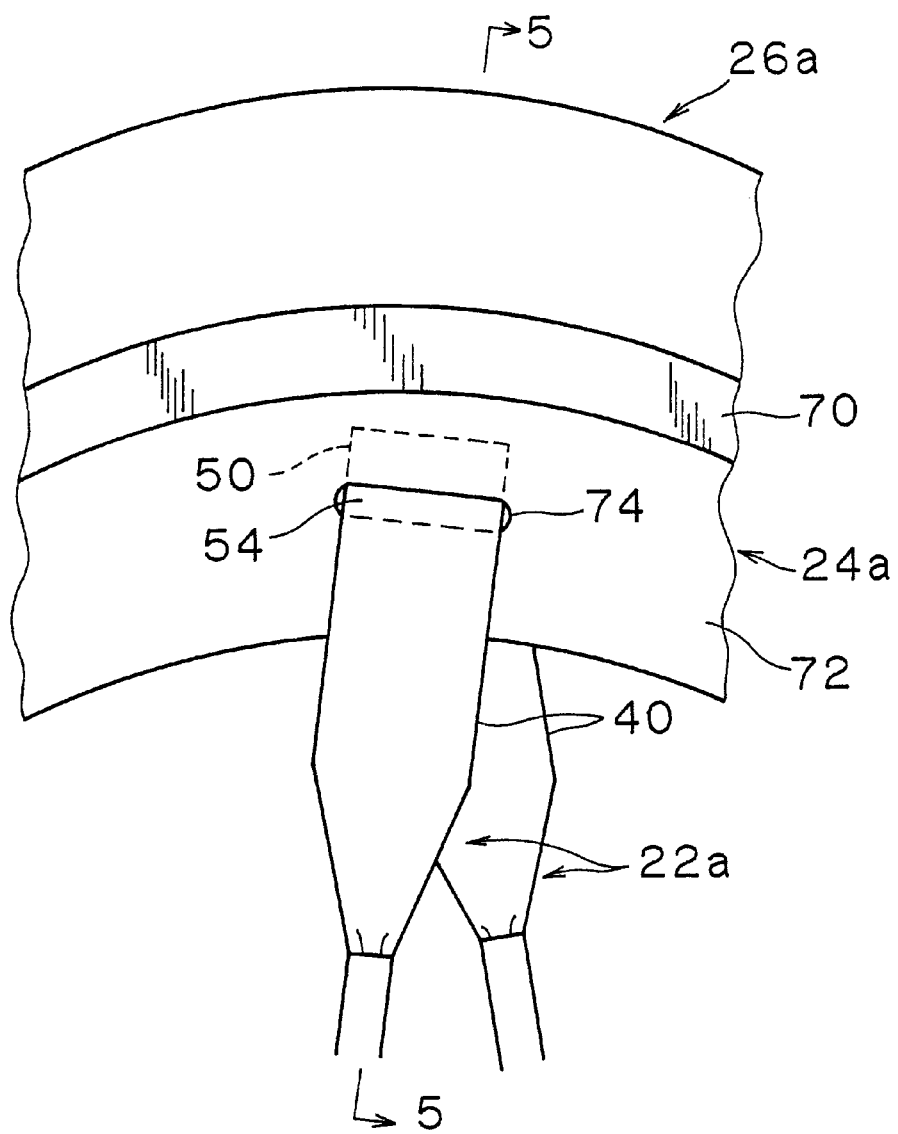
FIG. 4 is a partial, enlarged side elevational view of a portion of the front bicycle wheel illustrating the connection between the rim and two of the spokes of the bicycle wheel illustrated in FIG. 1.

As seen in FIGS. 4–6, first section 50 of each spoke 22a has a first contact surface 56 facing in a first direction to engage an inner surface of rim 24a, while second section 52 of each spoke 22a has a second contact surface 58 facing in a second direction to engage the outer surface of rim 24a. The lateral spacing between first contact surface 56 of first section 50 and second contact surface 58 is preferably slightly larger than the thickness of rim 24a. Accordingly, when spokes 22a are installed in rim 24a, spokes 22a engage rim 24a to prevent any substantial movement therebetween.

Optionally, additional fastening means such as an adhesive or cement or the like can be utilized to more firmly and fixedly secure outer end portions 40 of spokes 22a to the spoke attachment portions of the annular rim 24a. The term "adhesive" as used herein, including the claims, includes any compound or material which can be used to secure to materials together including cements and the like. Moreover, fasteners or fastening means (not shown), such as spot welding, rivets or threaded fasteners or the like, can be utilized if needed and/or desired. Such fasteners can extend through either first contact surface 56 or second contact surface 58, and into the side portions of rim 24a. In addition, fasteners can be used in conjunction with adhesive or the like.

Center portions 42 of spokes 22a are illustrated as being substantially straight wire type spokes with a substantially circular cross-section. However, it will be apparent to those skilled in the art from this disclosure that center portions 42 of spokes 22a can be configured to have other types of cross-sections and/or shapes. For example, center portions 42 can be more rectangular in cross-section with the shape being uniformed along the entire length of center portion 42. Alternatively, the cross-section of center portion 42 can vary along its length such that the cross-section of center portion 42 becomes wider as it approaches hub 24a. In other words, the thickness and/or width of center portion 42 can be either uniformed or varied as needed and/or desired.

Inner end portions 44 of spokes 22a are threaded for receiving conventional spoke nipples 46 thereon. More specifically, inner end portions 44 of spokes 22a are received within one end of bores 34a of hub 20a, and then spoke nipples 46a are inserted through the other end of bores 34a such that the headed or flanged portion of the spoke nipples 46 engage an internal abutment surface of bores 34. Accordingly, spokes 22a can be tightened in a substantially conventional manner between hub 20a and rim 24a to secure inner end portions 44 of spokes 22a thereto.

Rim 24a is a so-called deep rim in which the rim height is greater than the rim width and is designed to have pneumatic tire 26a fastened thereto by a tire cement. Of course, rim 24a can have other shapes to accommodate other types of tires as needed and/or desired without departing from the scope of the present invention. Annular rim 24a is constructed of a substantially rigid material which is known to be used in the art. For example, rims 24a can be constructed of any suitable metallic material, such as plated steel, stainless steel, aluminum or titanium, as well as other non-metallic materials, such as a carbon fiber composite, which can be utilized for a bicycle wheel.

Rim 24a is substantially circular as seen in side elevation (FIG. 1), and has an outer annular surface 68 adapted to receive pneumatic tire 26a thereon, a pair of annular braking portions 70 located on the sides of rim 24a and a pair of annular spoke attachment portions 72 located on the sides of rim 24a as seen in FIG. 5. Rim 24a is a tubular member with a hollow, annular inner area. It will be apparent to those skilled in the art that the shape of outer annular surface 68 of rim 24a could be modified to accommodate different types of tires such as "clinchers" as needed and/or desired. In the preferred embodiment, outer annular surface 68 of rim 24a is designed for use with "tubular" or "sew-up" type tires which are cemented to outer annular surface 68.

Braking portions 70 are preferably substantially flat, circular surfaces which are designed to be engaged with the brake pads of a brake device for slowing or stopping rotation of wheel 10. Braking portions 70 are preferably parallel to each other and located between outer annular surface 68 and one of the spoke attachment portions.

Spoke attachment portions 72 are located radially inwardly relative to outer annular surface 68 and braking portions 70 of the rim 24a. Preferably, spoke attachment portions 72 are angled towards each other to form a substantially V-shaped section of rim 24a with its apex pointed towards the center of wheel 10. Each spoke attachment portion 72 has a plurality of openings 74 for receiving first sections 50 of the spokes 22a therein. Openings 74 are preferably equally spaced about spoke attachment portions 72. In this first embodiment, the plurality of openings 74 are preferably elongated openings or slots which are sized and shaped to receive the outer end portions of the spokes therein. Elongated openings 74 distribute the forces on rim 24a over a greater area than ordinary round spokes such that stress fracturing and/or tearing of rim 24a is minimized.

Preferably, openings 74 are spaced from the innermost edge of rim 24a by at least 5.0 millimeters to increase the resistance of damage to rim 24a. Preferably, the radial distance from the inner edge of openings 74 to the innermost edge of rim 24a is at least one third the circumferential length of opening 74. The farther openings 74 can be spaced from the inner peripheral edge of rim 24a, the stronger the connection between spokes 22a and rim 24a. The radial widths of openings 74a are preferably substantially equal to or slightly greater than the widths of spokes 22a so that debris, dirt and the like does not enter the hollow area of rim 24a. In the preferred embodiments, the thickness of spokes 22a at first end sections 50 is in the range of approximately 0.5 millimeters to approximately 3.0 millimeters. Accordingly, openings 74 can have a radial width in the range of approximately 0.5 millimeters to approximately 5.0 millimeters. In one example, the thickness of first end section 50 of each spoke 22a is approximately 1.0 millimeters and the radial width of each opening 74 is approximately 1.2 millimeters.

In the preferred embodiments of the present invention, first end sections 50 and bend sections 54 are configured such that they can pass freely through openings 74 of rim 24a such that it is unnecessary to have either center portion 42 or inner end portion 44 of each spoke to pass through openings 74. Moreover, openings 74 are preferably configured to be substantially the same shape as the cross-section of bend sections 54 of spokes 22a and only slightly larger as mentioned above. Thus, openings 74 limit movement of bend sections 54 therein when spokes 22a are in the installed position. In particular, the shapes and cross-sections of first section 50, second section 52 and bend section 54 of each spoke should be configured to prevent axial movement of the spoke relative to rim 24a when the spoke is in the installed position.

Second Embodiment

Figure 7:
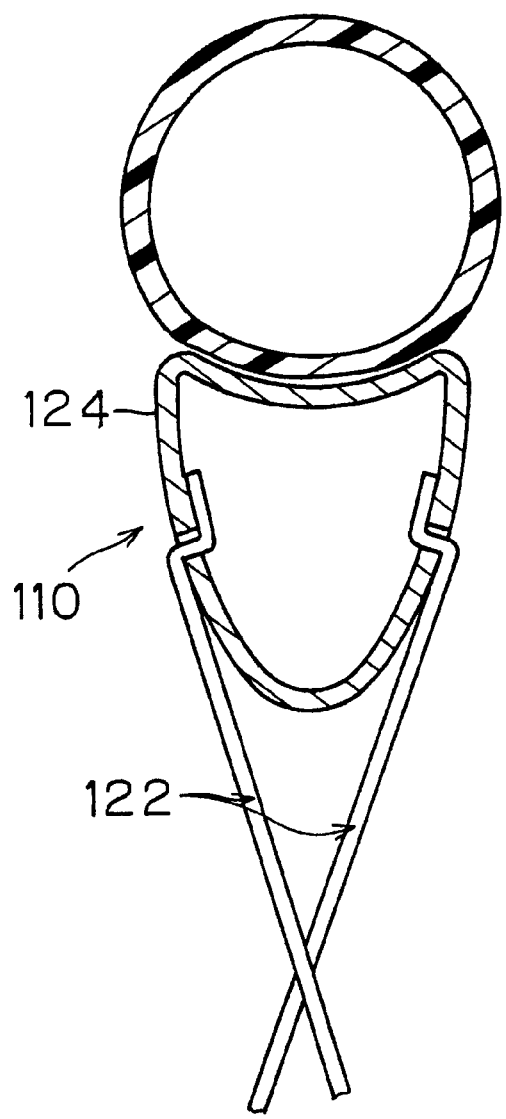
FIG. 7 is a partial, cross-sectional view of a bicycle rim and two bicycle spokes in accordance with a second embodiment of the present invention.
Figure 8A:
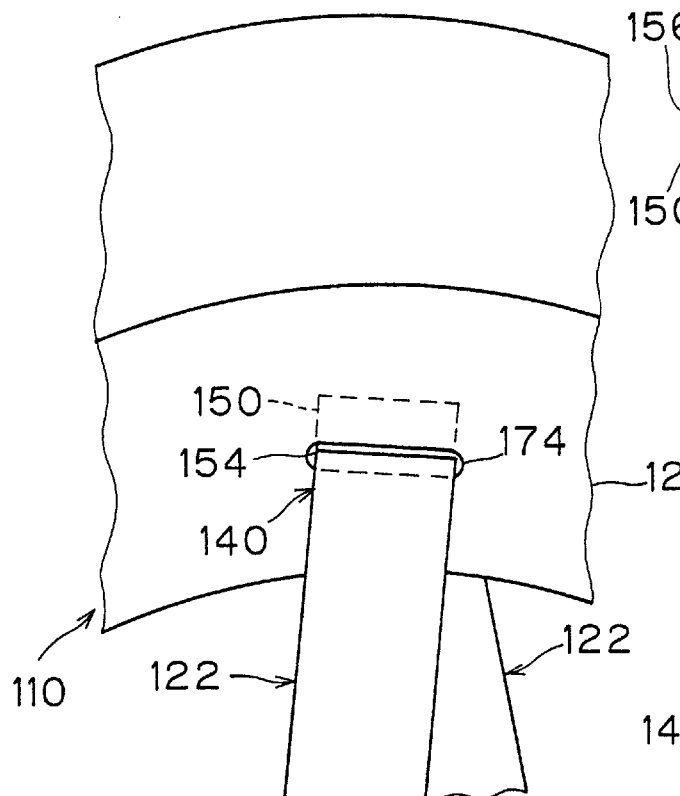
FIG. 8a is an enlarged perspective view of one of the spokes utilized in the bicycle wheels illustrated in FIGS. 7 and 8 in accordance with the second embodiment of the present invention.
Figure 8B:
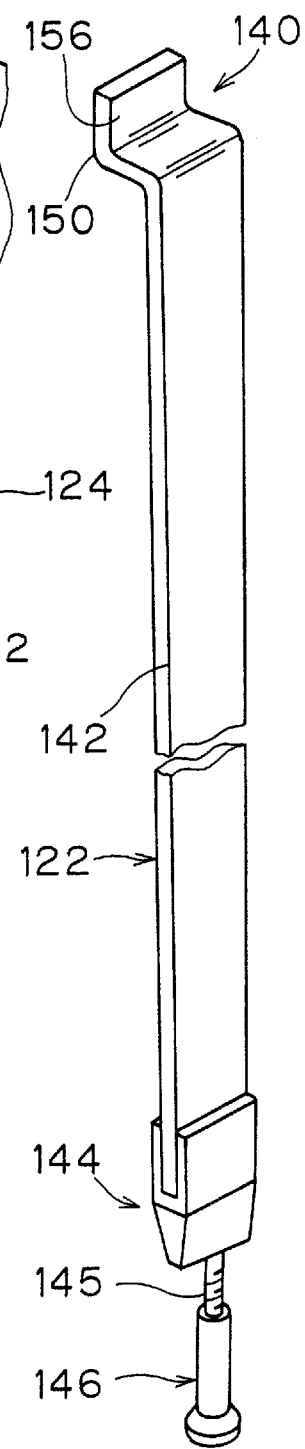
FIG. 8 is a partial, side elevational view of the bicycle rim and two bicycle spokes illustrated in FIG. 7 in accordance with the second embodiment of the present invention.

As seen in FIGS. 7 and 8, a bicycle wheel 110 with a modified rim and spoke connection is illustrated in partial cross-sectional view and side elevational view. In this embodiment, the shape of rim 124 has been changed as well as the shape of spokes 122. In particular, the shape of rim 124 has been changed such that space exists between exterior side surfaces of rim 124 and outer end portion 140.

Similar to the first embodiment, each of the spokes 122 has an outer end portion or spoke head 140 which extends into the hollow portion of rim 124 via openings 174, a substantially straight center portion 142 extending inwardly from outer end portion 140 and an inner end portion 144 located radially inwardly of center portion 142 such that inner end portion 144 is coupled to the hub. Preferably, outer end portion 140, center portion 142 and inner end portion 144 are constructed as a one-piece, unitary member with a connection member or spoke nipple 146 coupled to inner end portion 144 for connection to hub 20.

Spokes 122 are held in openings 174 of rim 124 via contact pressure between first contact surface 156 of first end section 150 engaging the inner surface of rim 124. Moreover, in this embodiment the inner end portions 144 of spokes 122 have a threaded member 145 fixedly coupled thereto for coupling spokes 122 to hub 20 via spoke nipple 146 as seen in FIG. 8a.

In view of the similarities between the first embodiment and the second embodiment of the present invention, this second embodiment will not be discussed or illustrated in detail herein. Rather, the description of the first embodiment discussed above should basically apply to this second embodiment.

Third Embodiment

Figure 9:
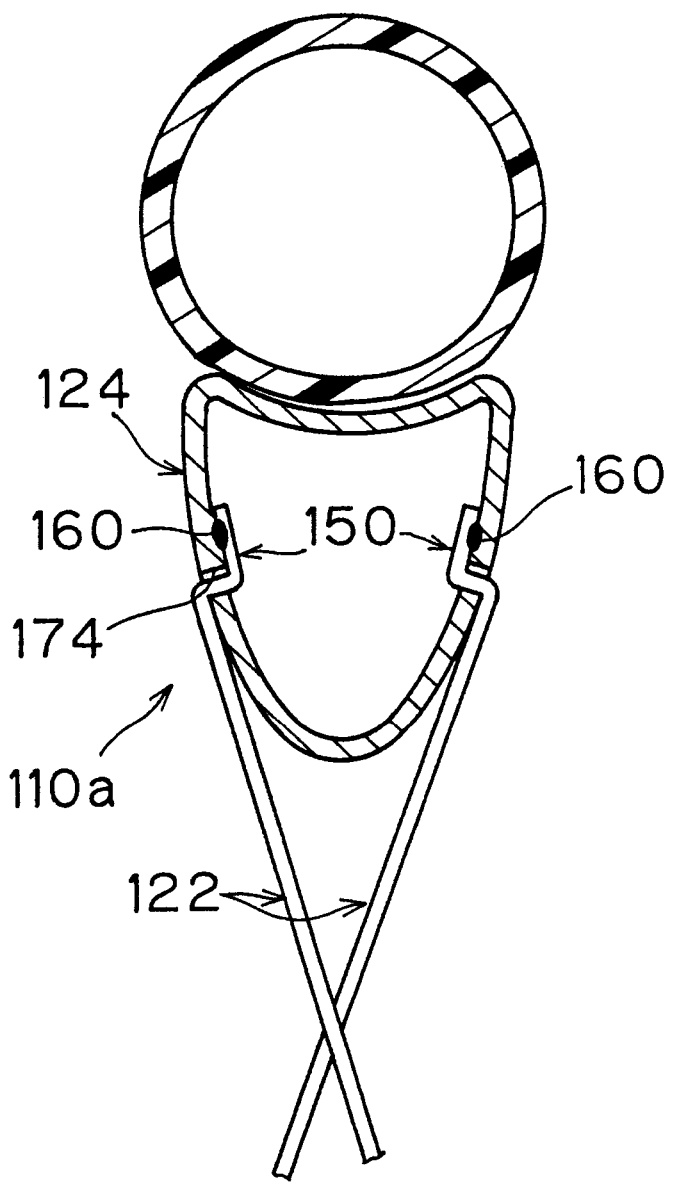
FIG. 9 is a partial, cross-sectional view of a bicycle rim and two bicycle spokes in accordance with a third embodiment of the present invention.

As seen in FIG. 9, a partial cross-sectional view of a bicycle wheel 110a is illustrated in accordance with a third embodiment of the present invention. The embodiment of FIG. 9 is basically identical to the embodiment illustrated in FIGS. 7 and 8, except that the spokes 122 are permanently secured to rim 124. In particular, the first end sections 150 of spokes 122 are fixedly secured to the inner surface of rim 124 via fastening means 160 such as spot welds, adhesive, cement or the like. Of course, fastening means 160 can also be a fastener such as a rivet or a bolt and nut or the like. Moreover, a fastener can be used in conjunction with an adhesive, cement or the like.

In view of the similarities of this embodiment with prior embodiments of the present invention, this embodiment will not be discussed or illustrated in detail herein. Rather, the description of the previous embodiments explaining the present invention applies to this embodiment.

Fourth Embodiment

Figure 10:
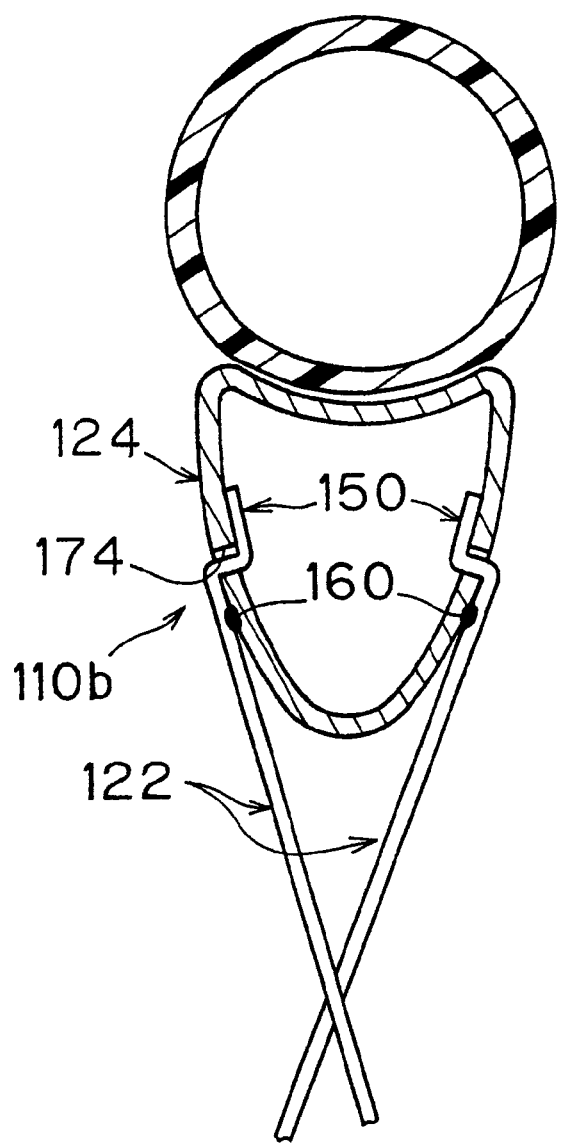
FIG. 10 is a partial, cross-sectional view of a bicycle rim and two bicycle spokes in accordance with a fourth embodiment of the present invention.

As seen in FIG. 10, a partial cross-sectional view of a bicycle wheel 110b in accordance with the present invention is illustrated. This embodiment is substantially similar to the embodiments of FIGS. 7–9, except for the positioning of the fastening means 160. In this embodiment, spokes 122 are permanently secured to the exterior surface of rim 124 via fastening means 160 such as spot welds, adhesive, cement or the like. Of course, fastening means 160 can also be a fastener such as a rivet or a bolt and nut or the like. Moreover, a fastener can be used in conjunction with an adhesive, cement or the like. In view of the similarities between this embodiment and the previous embodiments, this embodiment will not be discussed or illustrated in detail herein.

Fifth Embodiment

Figure 11:
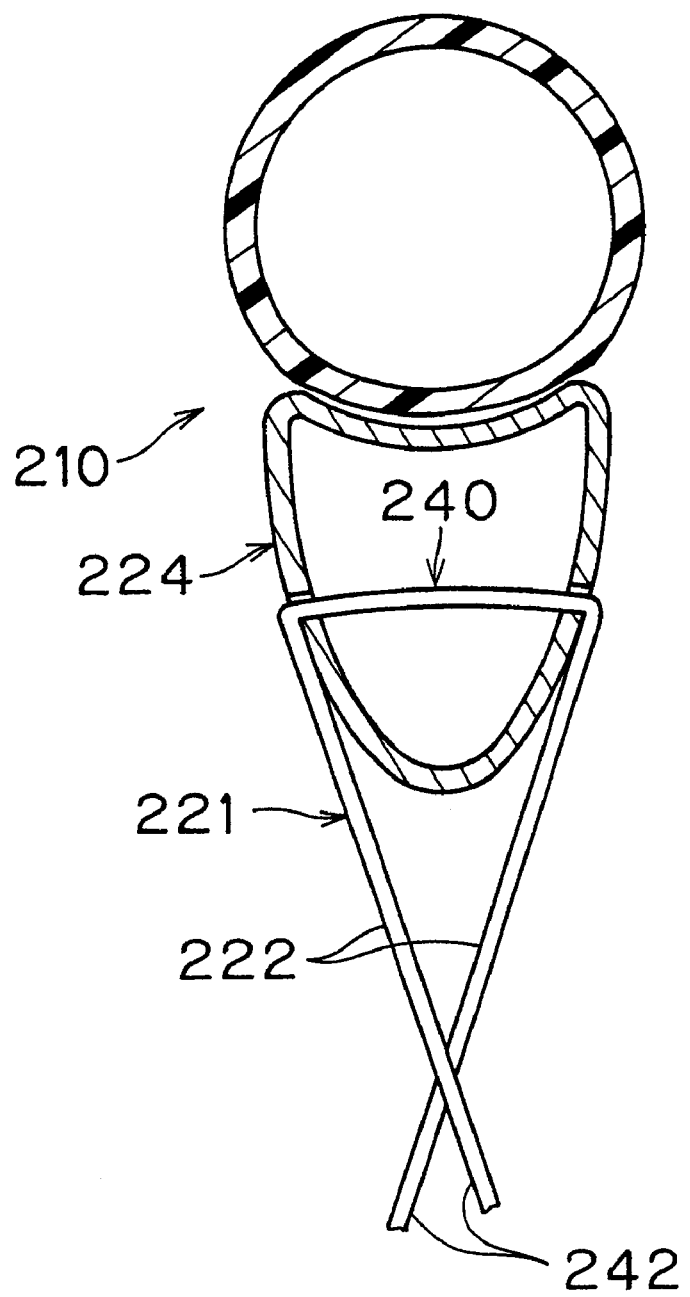
FIG. 11 is a partial, cross-sectional view of a bicycle rim and two bicycle spokes in accordance with a fifth embodiment of the present invention.
Figure 12:
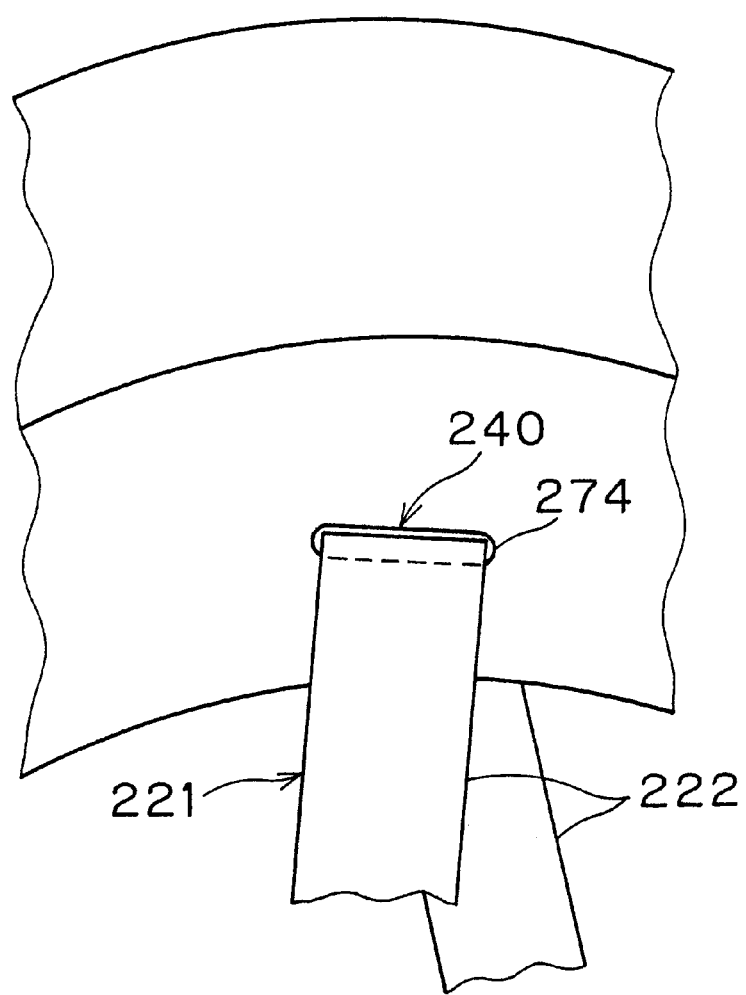
FIG. 12 is a partial, side elevational view of the bicycle rim and two bicycle spokes illustrated in FIG. 11 in accordance with the fifth embodiment of the present invention.

As seen in FIGS. 11 and 12, a partial cross-sectional view and a partial elevational view of a bicycle wheel 210 are illustrated in accordance with a fifth embodiment of the present invention. In this embodiment, a one-piece spoke 221 is utilized to create two spokes 222. In other words, each of the spokes 222 has an outer end portion or spoke head 240 which extends through the hollow portion of rim 224 via openings 274, a pair of straight center portions 242 located radially inwardly of outer end portion 240 and a pair of inner end portions (not shown) located radially inwardly of center portions 242 such that inner end portions are coupled to the hub. Preferably, outer end portion 240, center portions 242 and inner end portions are constructed as a one-piece, unitary member with connection members or spoke nipples coupled to inner end portions for connection to hub 20. Preferably, inner end portions are similar in construction to inner end portions 144 as seen in FIG. 8a.

In view of the similarities of this embodiment with prior embodiments of the present invention, this embodiment will not be discussed or illustrated in detail herein. Rather, the description of the previous embodiments explaining the present invention applies to this embodiment.

Sixth Embodiment

Figure 13:
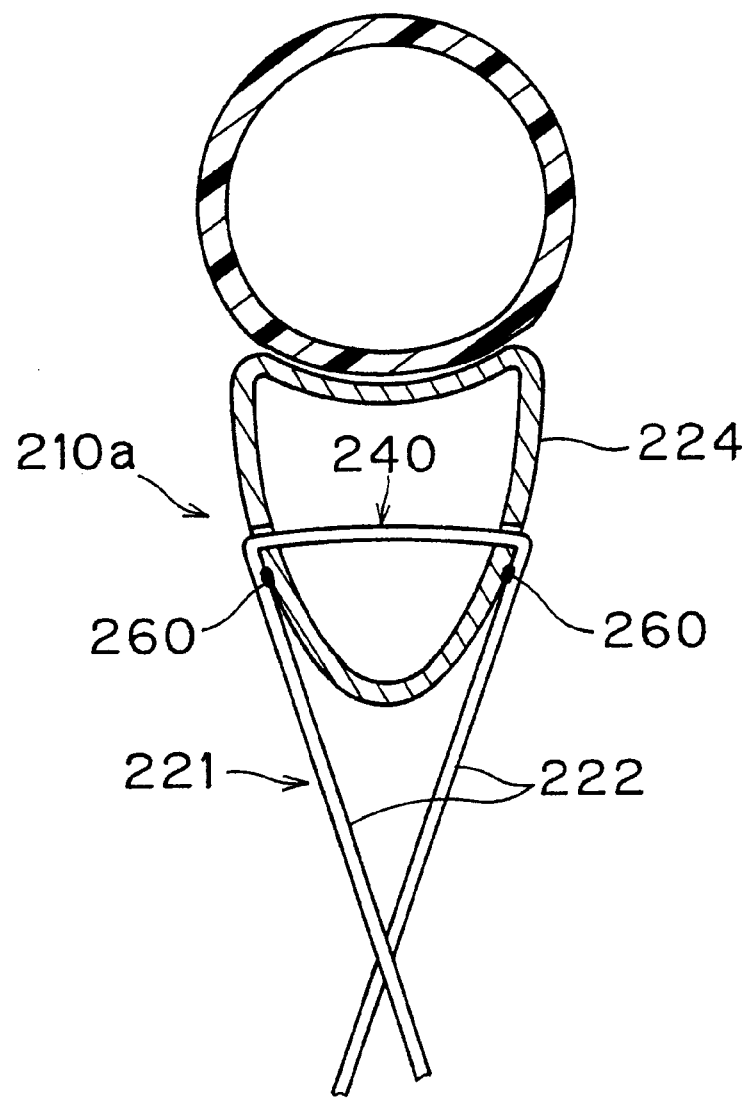
FIG. 13 is a partial, cross-sectional view of a bicycle rim and two bicycle spokes in accordance with a sixth embodiment of the present invention.

As seen in FIG. 13, a partial cross-sectional view of a bicycle wheel 210a is illustrated in accordance with a sixth embodiment of the present invention. This embodiment is similar to the embodiment illustrated in FIGS. 11 and 12, except that each of the spokes 222 are fixedly coupled to rim 224 via fastening means 260 such as spot welds, adhesive, cement or the like. Of course, fastening means 260 can also be a fastener such as a rivet or a bolt and nut or the like. Moreover, a fastener can be used in conjunction with an adhesive, cement or the like. In particular, the center portions 242 are each fixedly coupled to opposite sides of the exterior surface of the attachment portions of the rim.

In view of the similarities between this embodiment and the prior embodiments of the present invention, this embodiment will not be discussed or illustrated in detail herein. Rather, the description of the previous embodiments regarding the present invention should also apply to this embodiment.

Seventh Embodiment

Figure 14:
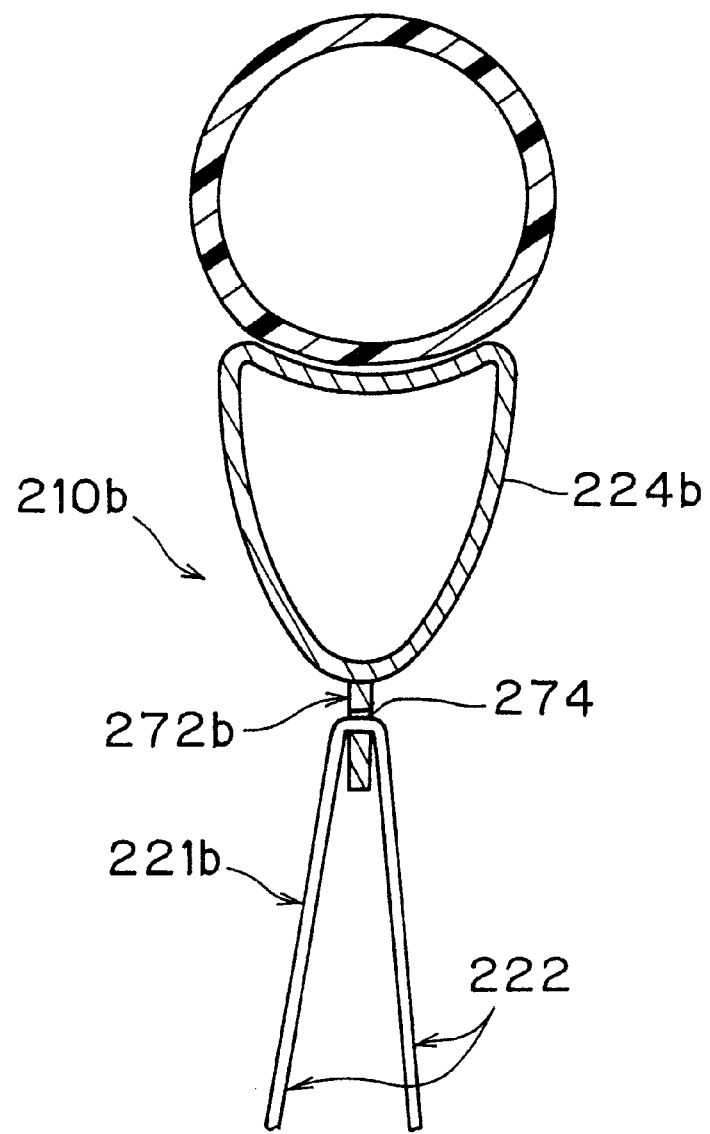
FIG. 14 is a partial, cross-sectional view of a bicycle rim and two bicycle spokes in accordance with a seventh embodiment of the present invention.

Referring to FIG. 14, a partial cross-sectional view of a bicycle wheel 210b in accordance with the present invention is illustrated. In this embodiment, a plurality of spoke attachment portions or members 272b (only one shown) with opening 274 are coupled to rim 224b at equally spaced apart locations. In this embodiment, a one-piece spoke 221b is utilized to form a pair of spokes 222. Of course, a single, annular flange may be used to form the spoke attachment portion of rim 224b.

In view of the similarities between this embodiment and the prior embodiments of the present invention, this embodiment will not be discussed or illustrated in detail herein. Rather, the description of the previous embodiments regarding the present invention should also apply to this embodiment.

Eighth Embodiment

Figure 15:
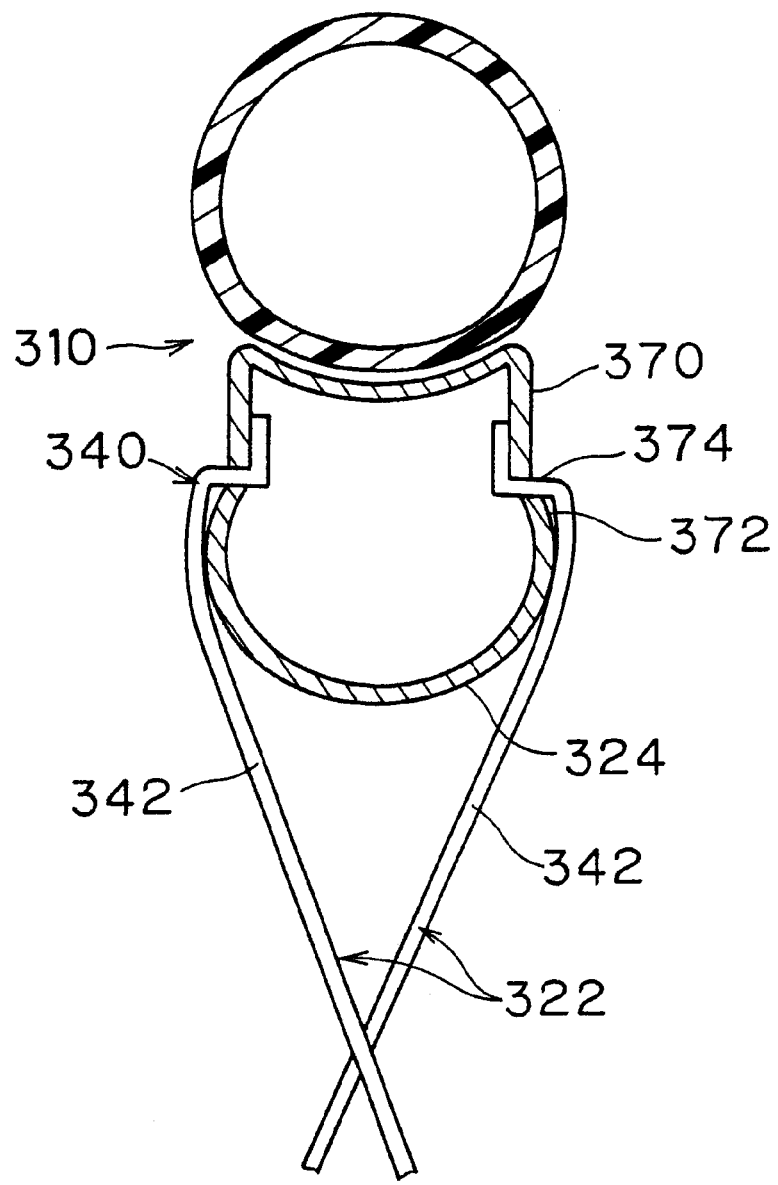
FIG. 15 is a partial, side elevational view of the bicycle rim and two bicycle spokes illustrated in FIG. 14 in accordance with the seventh embodiment of the present invention.
Figure 16:
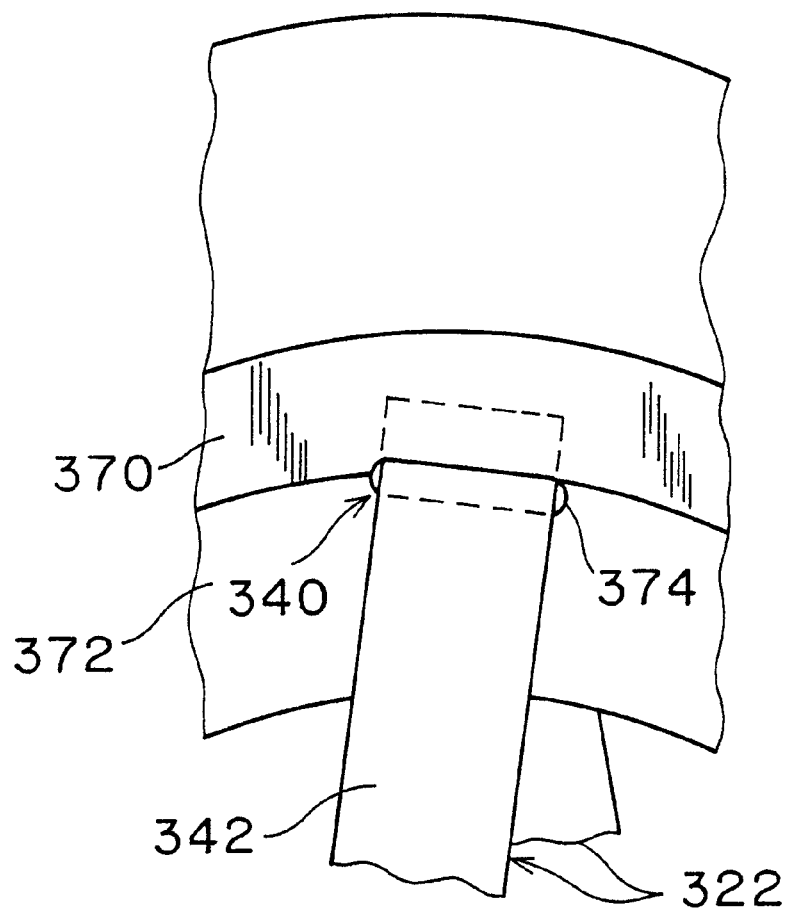
FIG. 16 is a partial, cross-sectional view of a bicycle rim and two bicycle spokes in accordance with an eighth embodiment of the present invention.

Referring now to FIGS. 15 and 16, a partial cross-sectional view and a partial elevational view of a bicycle wheel 310 in accordance with an eighth embodiment of the present invention is illustrated. Similar to the first embodiment, each of the spokes 322 has an outer end portion or spoke head 340 which extends into the hollow portion of rim 324 via openings 374, a substantially straight center portion 342 extending inwardly from outer end portion 340 and an inner end portion (not shown) located radially inwardly of center portion 142 such that inner end portion is coupled to the hub. Preferably, outer end portion 140, center portions 142 and inner end portion are constructed as a one-piece, unitary member with a connection member or spoke nipple coupled to inner end portion for connection to hub 20.

Spokes 122 are held in openings 174 of rim 124 via contact pressure between first contact surface 156 of first end section 150 engaging the inner surface of rim 124. Moreover, in this embodiment the inner end portions 144 of spokes 122 have a threaded member 145 fixedly coupled thereto for coupling spokes 122 to hub 20 via spoke nipple 146 as seen in FIG. 8a.

In this embodiment, the attachment portions 372 are bowed outwardly to form a bulged section such that the outermost point of the attachment portions 372 are spaced farther apart than the braking portions 370. In otherwords, the bulged section of the attachment portions 372 has an axial width which is greater than the axial width between the braking portions 370. Accordingly, spokes 322 are bent along this curved section for attachment to the hub.

In view of the similarities of this embodiment to the prior embodiments described herein, this embodiment will not be discussed or illustrated in detail herein. Rather, the description of the prior embodiments of the present invention should apply to this embodiment.

Ninth Embodiment

Figure 17:
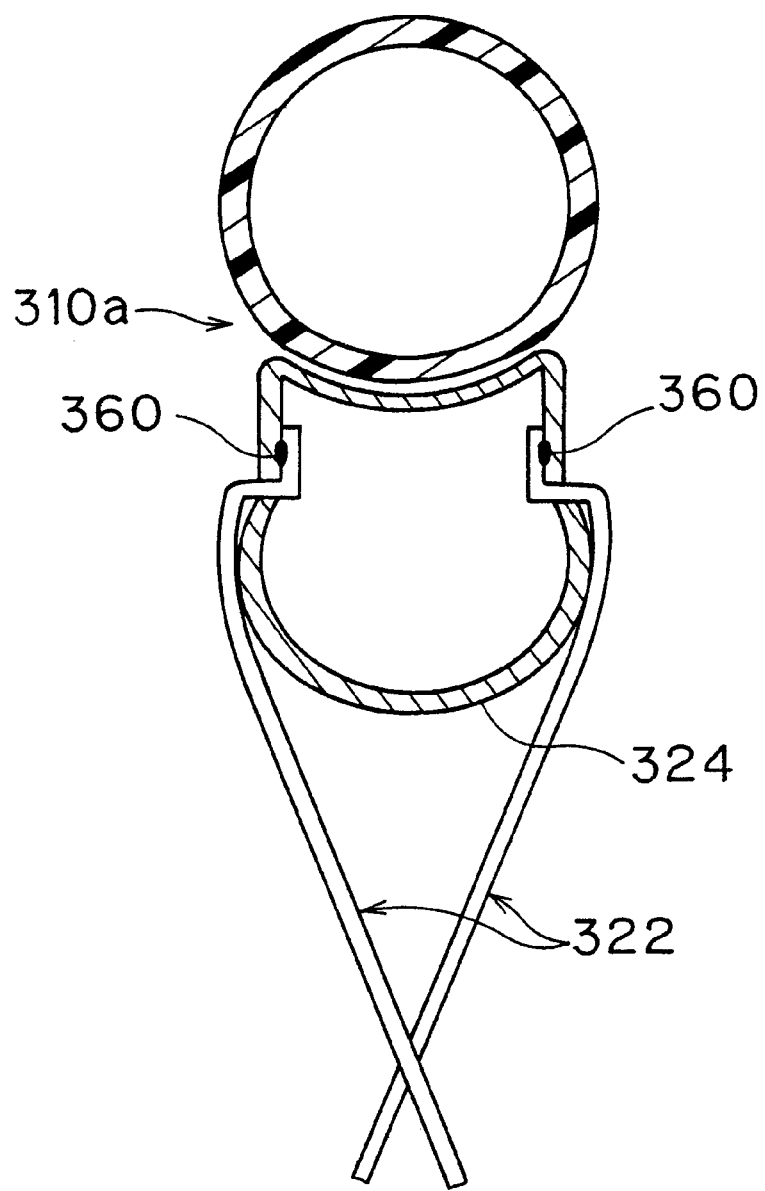
FIG. 17 is a partial, cross-sectional view of a bicycle rim and two bicycle spokes in accordance with a ninth embodiment of the present invention.

As seen in FIG. 17, a cross-sectional elevational view of a bicycle wheel 310a in accordance with a ninth embodiment of the present invention is illustrated. This embodiment is substantially identical to the eighth embodiment, except that the spokes 322 are permanently coupled to rim 324. In this embodiment, the spokes 322 are fixedly coupled to rim 324 via fastening means 360 such as spot welds, adhesive, cement or the like. Of course, fastening means 360 can also be a fastener such as a rivet or a bolt and nut or the like. Moreover, a fastener can be used in conjunction with an adhesive, cement or the like. In other words, spokes 322 are fixedly or permanently secured to rim 324. The fastening means 360 is located along the upper part of the center portions of spokes 222 in this embodiment.

In view of the similarities between this embodiment and the prior embodiments of the present invention, this embodiment will not be discussed or illustrated in detail herein. Rather, the description of the features of the present invention as described in the prior embodiments should also apply to this embodiment.

Tenth Embodiment

Figure 18:
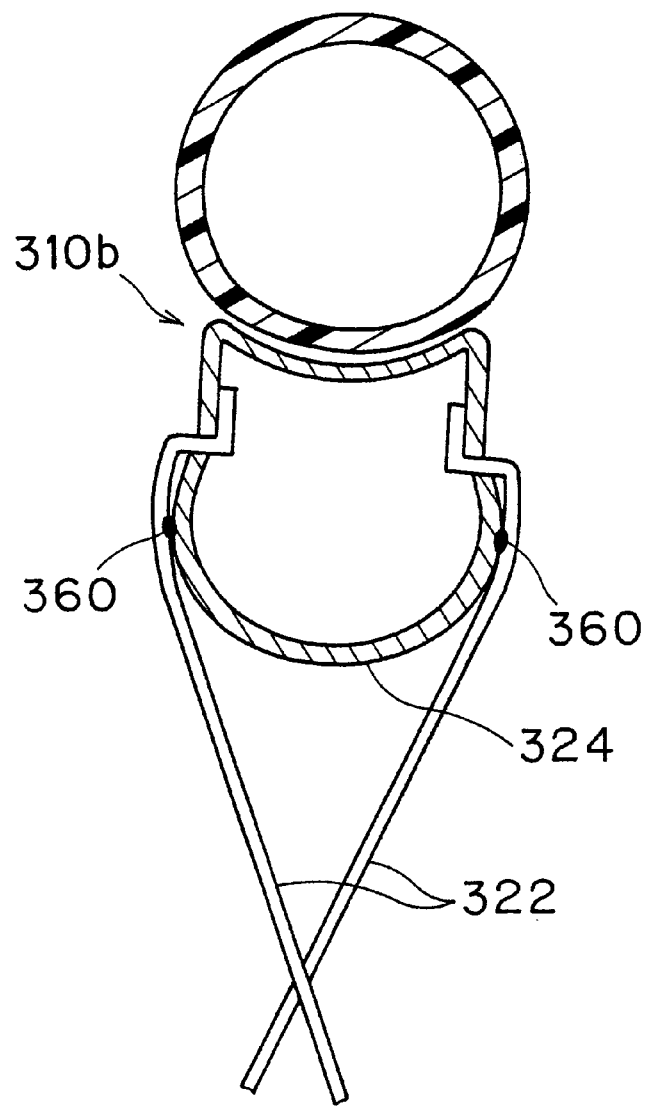
FIG. 18 is a partial, cross-sectional view of a bicycle rim and two bicycle spokes in accordance with a tenth embodiment of the present invention.

As seen in FIG. 18, a partial cross-sectional view of a bicycle wheel 310b is illustrated for use with spokes 322. In this embodiment, the spokes 222 are permanently coupled to the inner surface of rim 324 via fastening means 360 such as spot welds, adhesive, cement or the like. Of course, fastening means 360 can also be a fastener such as a rivet or a bolt and nut or the like. Moreover, a fastener can be used in conjunction with an adhesive, cement or the like. Basically, this embodiment is identical to the prior two embodiments illustrated in FIGS. 14–16, except for the positioning of the welds or adhesive or fastener.

In view of the similarities between this embodiment and prior embodiments of the present invention, this embodiment will not be discussed or illustrated in detail herein. Rather, the description of the prior embodiments should also apply to this embodiment.

Eleventh Embodiment

Figure 19:
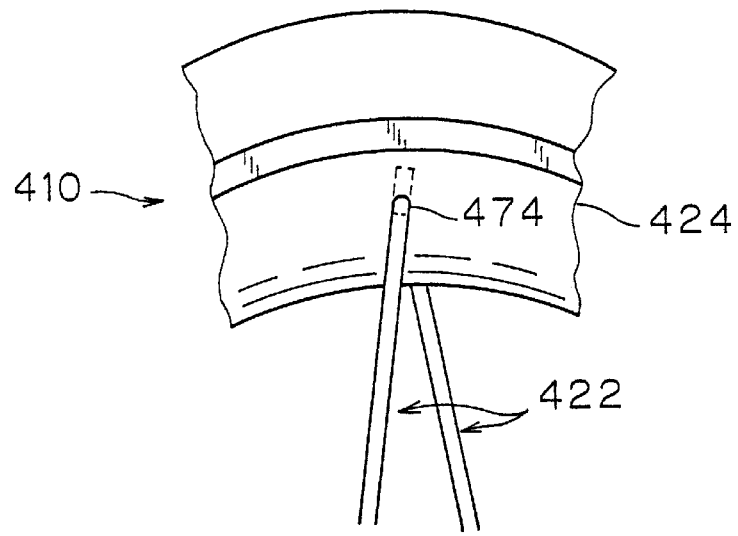
FIG. 19 is a partial, side elevational view of a bicycle rim and two bicycle spokes in accordance with an eleventh embodiment of the present invention.

As seen in FIG. 19, a partial elevational view of a bicycle wheel 410 with a modified rim and spoke connection is illustrated. Basically, in this embodiment, the cross-section of the spokes 422 (only one shown) have been changed to be substantially circular along its entire length, and the openings 474 in the rim 424 has also been made substantially circular. Of course, it will be apparent to those skilled in the art from this disclosure that the spokes 422 can have other cross-sections with the openings 474 in the rim 424 corresponding to the cross-section of the spokes 422.

In view of the similarities between this embodiment and the prior embodiments of the present invention, this embodiment will not be discussed or illustrated in detail herein. Rather, the description of the prior embodiments should apply to this embodiment.

Twelfth Embodiment

Figure 20:
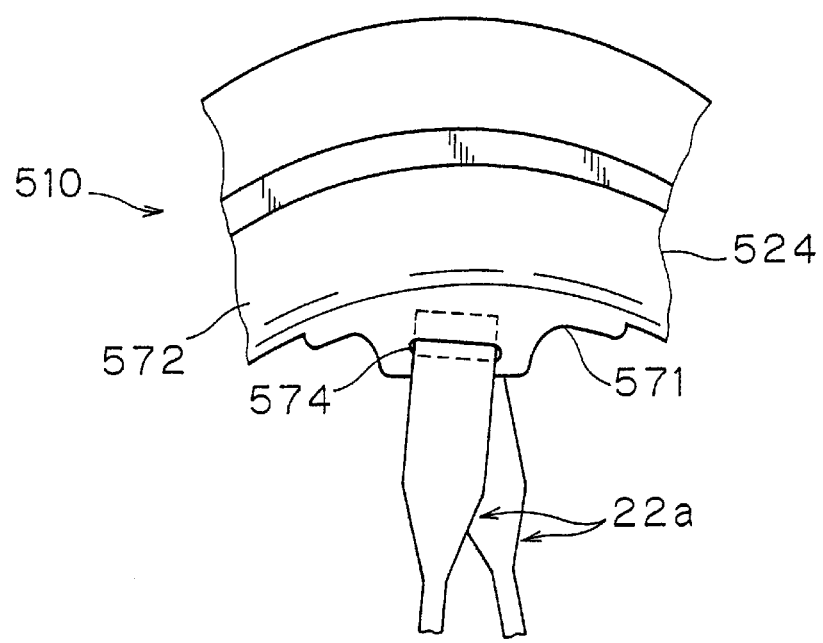
FIG. 20 is a partial, side elevational view of a bicycle rim and two bicycle spokes in accordance with a twelfth embodiment of the present invention.

As seen in FIG. 20, a partial elevational view of a bicycle wheel 510 with a modified rim 524 is illustrated for use with spokes 22a of the first embodiment. In this eleventh embodiment, the rim 524 is provided with a plurality of protrusions 571 (only one shown) which form a part of the attachment portions 572 of the rim 524. Protrusions 571 are equally spaced about the inner periphery of bicycle wheel 510 and each has a pair of openings 574 for receiving a pair of spokes 22a. Accordingly, the spokes 22a and rim 524 are coupled together in substantially the same manner as discussed above pertaining to the first embodiment of the present invention.

In view of the similarities between this embodiment and the prior embodiments of the present invention, this embodiment will not be discussed or illustrated in detail herein. Rather, the description of the prior embodiments should apply to this embodiment.

Thirteenth Embodiment

Figure 21:
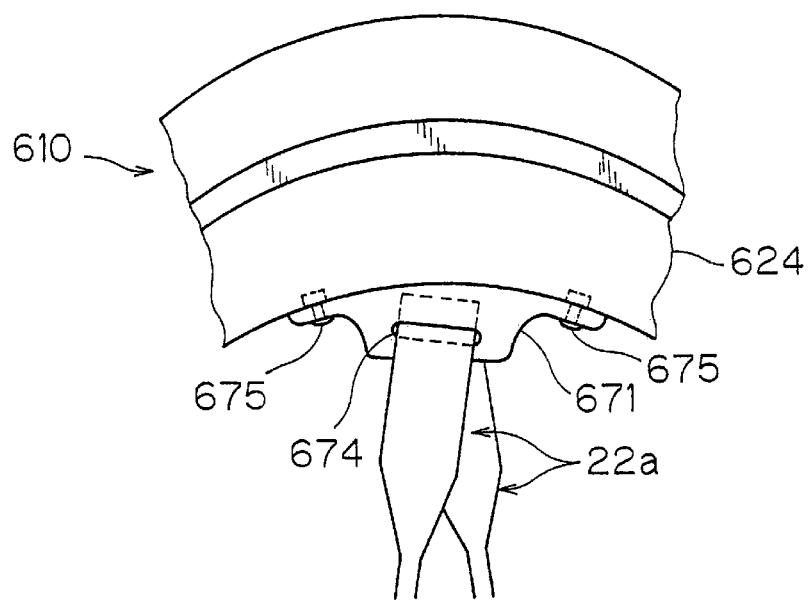
FIG. 21 is a partial, side elevational view of a bicycle rim and two bicycle spokes in accordance with a thirteenth embodiment of the present invention.

As seen in FIG. 21, a partial elevational view of a bicycle wheel 610 in accordance with a thirteenth embodiment of the present invention is illustrated in which the rim 624 of the bicycle wheel 610 has a plurality of attachment members 671 (only one shown) which form a part of attachment portions 672. Attachment members 671 are fastened to the rim 624 by fasteners 675. Attachment members 671 have a pair of openings 674 for connecting a pair of spokes 22a thereto. In other words, this embodiment illustrates that the rim 624 can be constructed of additional parts. Moreover, the spoke attachment portions 672 can be constructed of a different material from the material of the remainder of rim 624 to provide a shock absorbing type affect if needed and/or desired.

In any event, in view of the similarities between this embodiment and the prior embodiments, the interconnection of the spokes to the attachment portions will not be discussed or illustrated in detail herein.

Fourteenth Embodiment

Referring now to FIGS. 22–27, a bicycle wheel 710 in accordance with a fourteenth embodiment of the present invention is illustrated. In this embodiment, rim 724 has a plurality of openings 774 for connecting spokes 722 thereto in a somewhat similar manner as in the first embodiment. Openings 774 are preferably equally spaced about the periphery of rim 724 and are substantially rectangular in shape. Similarly to the first embodiment, rim 724 preferably has six or eight openings 774 on each sidewall of rim 724 such that twelve or sixteen spokes 722 are connected between rim 724 and the hub.

In view of the similarities between this embodiment and the prior embodiments, various details of this embodiment have not been discussed or illustrated herein. Rather, it will be apparent to those skilled in the art from this disclosure that the description of the construction and functions of various elements of the prior embodiments should apply to this embodiment.

The outer annular surface 768 of rim 724 which receives the pneumatic tire has a plurality of access slots 777 which are sized to receive spokes 722 therethrough as explained below. Accordingly, openings 777 of outer annular surface 768 are positioned adjacent to openings 774 which are located on the sidewalls or attachment portions 772 of rim 724.

Openings 774 preferably have a radial width of approximately 5.0 millimeters. The circumferential widths of openings 774 are preferably sized to be substantially equal to or slightly larger than the circumferential width of the portion of the spokes 722 located therein.

Figure 22:
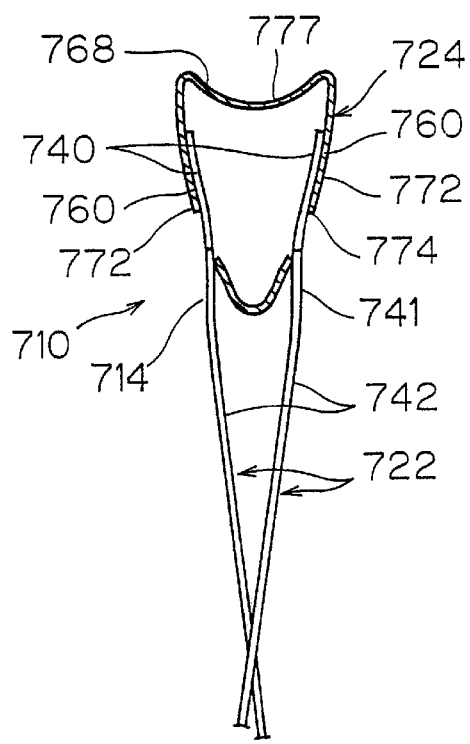
FIG. 22 is a partial, cross-sectional view of a bicycle rim and two bicycle spokes in accordance with a fourteenth embodiment of the present invention.
Figure 23:
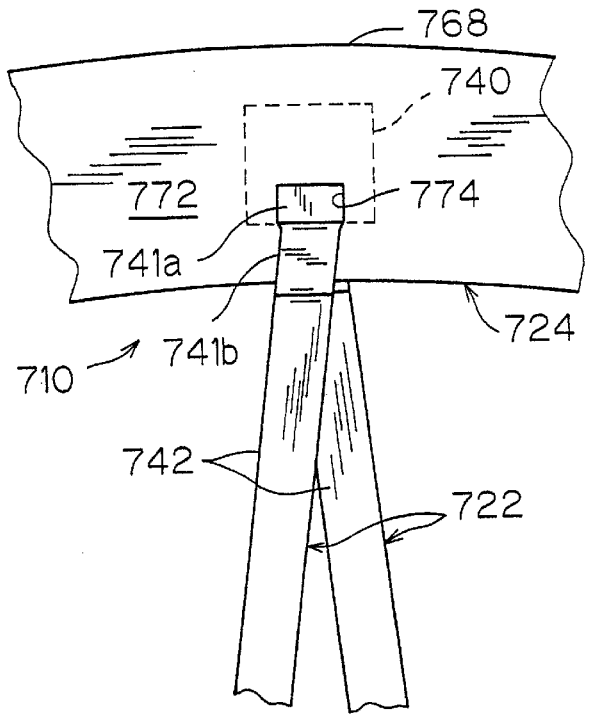
FIG. 23 is a partial, side elevational view of the bicycle rim and two bicycle spokes illustrated in FIG. 22 in accordance with the fourteenth embodiment of the present invention.
Figure 24:
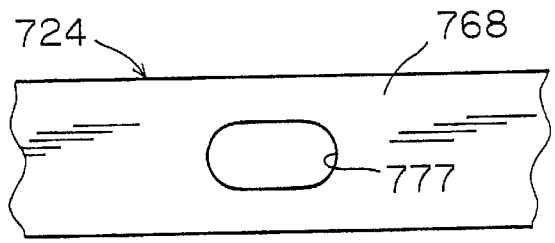
FIG. 24 is a partial, top plan view of a portion of the bicycle rim illustrated in FIGS. 22 and 23 in accordance with the fourteenth embodiment of the present invention.
Figure 25:
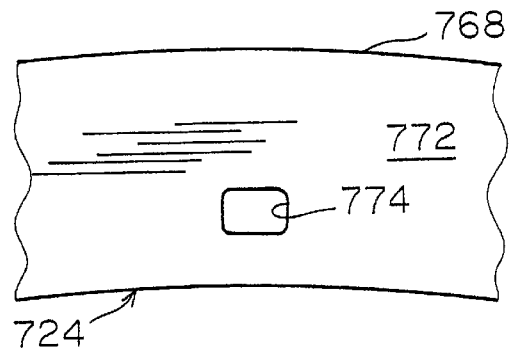
FIG. 25 is a partial, side elevational view of the bicycle rim illustrated in FIGS. 22–24 in accordance with the fourteenth embodiment of the present invention.
Figure 26:
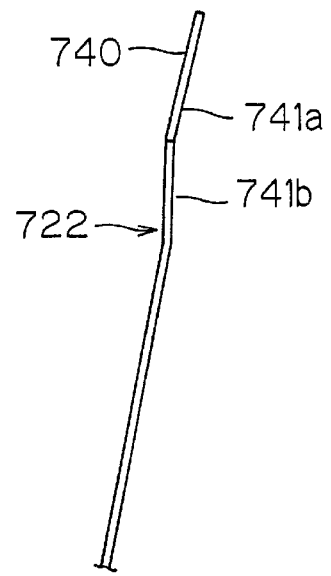
FIG. 26 is a partial edge elevational view of one of the bicycle spokes utilized in constructing the bicycle wheel illustrated in FIGS. 22 and 23 in accordance with the fourteenth embodiment of the present invention.
Figure 27:
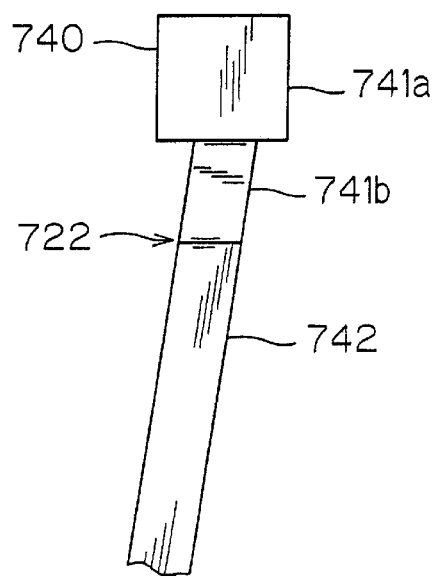
FIG. 27 is a partial, side elevational view of the bicycle spoke illustrated in FIG. 26 for use with the bicycle wheel assembly illustrated in FIGS. 22 and 23 in accordance with the fourteenth embodiment of the present invention.
Figure 28:
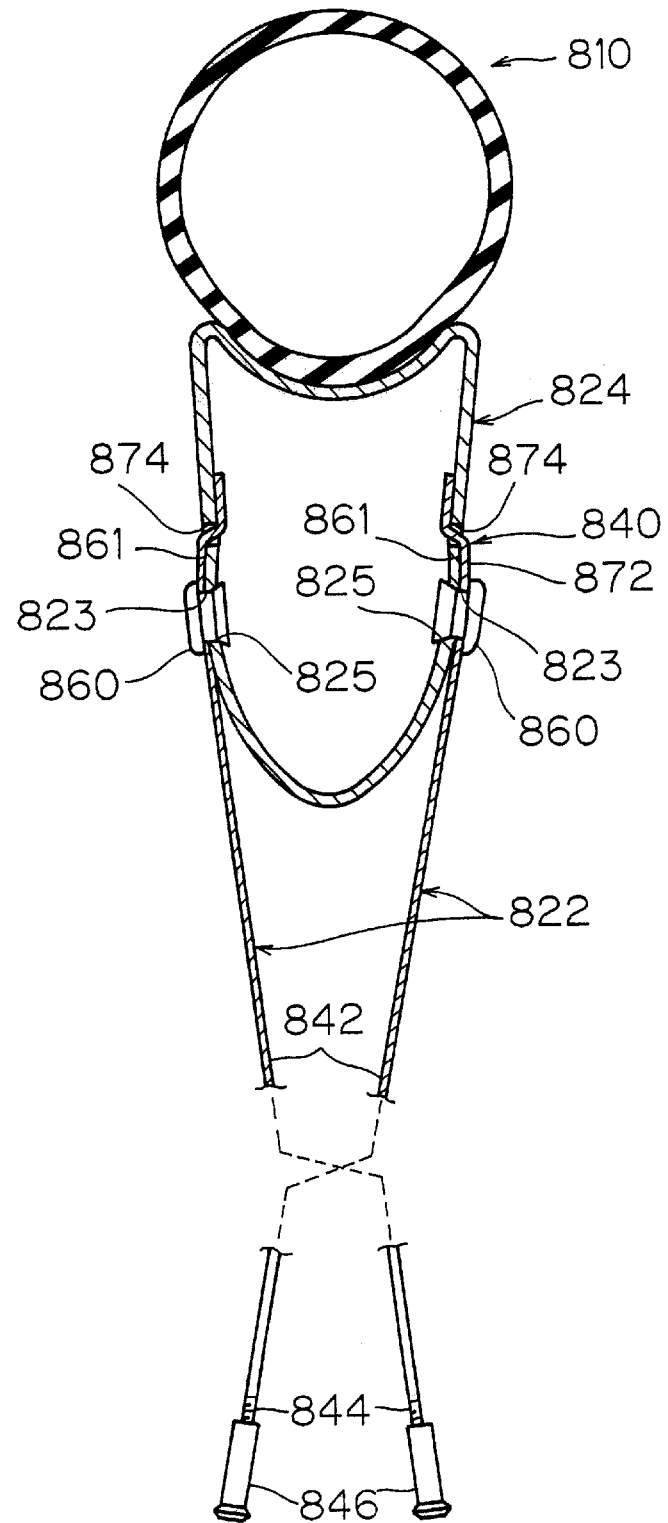
FIG. 28 is a partial, cross-sectional view of a bicycle rim and two bicycle spokes in accordance with a fifteenth embodiment of the present invention.
Figure 29:
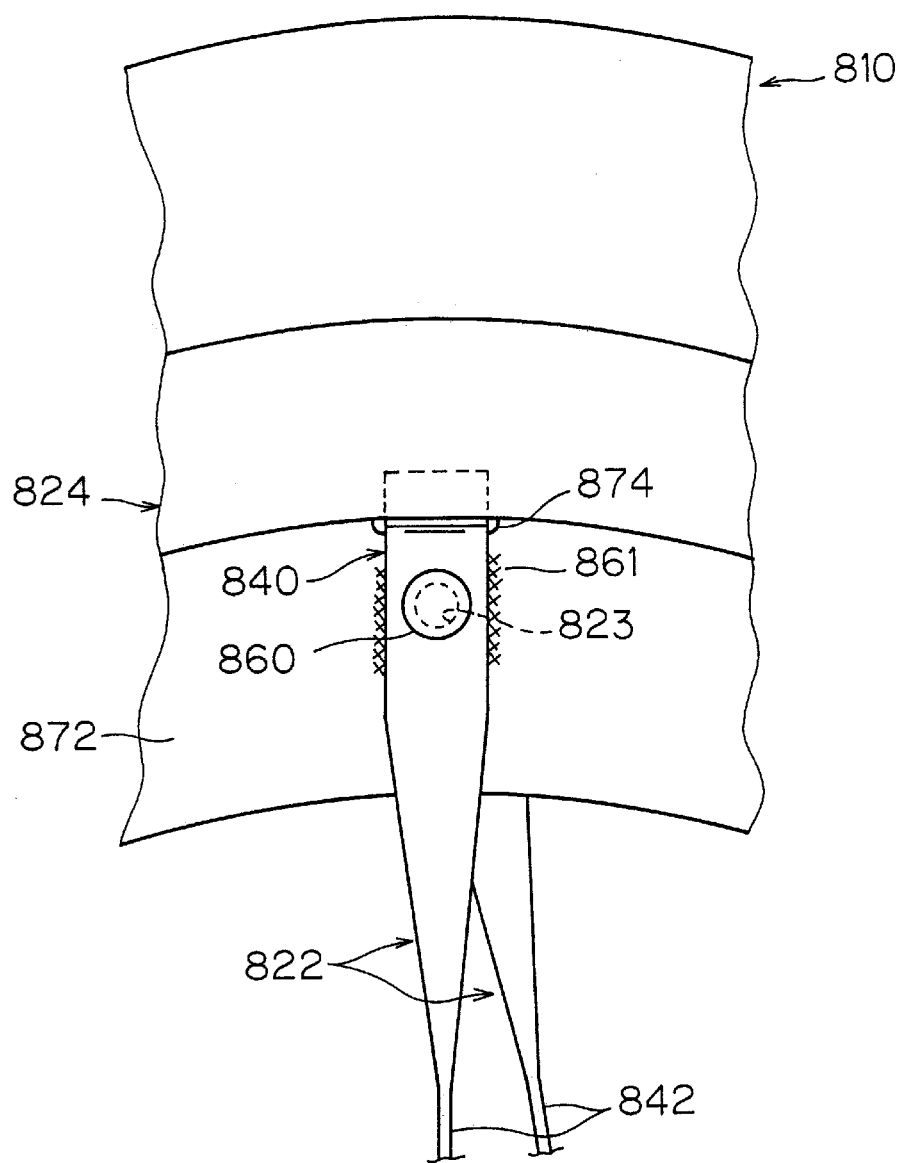
FIG. 29 is a partial, side elevational view of the bicycle rim and two bicycle spokes illustrated in FIG. 28 in accordance with the fifteenth embodiment of the present invention.
Figure 30:
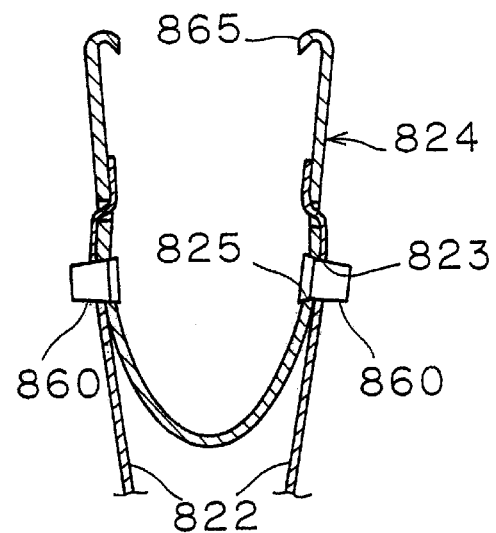
FIG. 30 is a partial, cross-sectional view of a bicycle rim and two bicycle spokes illustrated in FIGS. 28 and 29, prior to the rivets being deformed to fixedly secure the spokes to the rim.

As best seen in FIGS. 22 and 23, each of the spokes 722 has an outer end portion or spoke head 740 which is received in the annular hollow area of rim 724. Each spoke 722 also has a center portion 742 extending inwardly from outer end portion 740 towards the hub and has an inner end portion or connector (not shown) attached to its free end which is in turn adapted to be coupled to a bicycle wheel hub in the manner shown in the preceding embodiments. Preferably, spoke 722 is constructed of a sheet material having a substantially uniform thickness.

The outer end portion or spoke head 740 has a first enlarged section 741a and a narrower second section 741b such that each spoke 722 is secured within rim 724 by its first section 741a of outer portion 740 engaging opening 774 of rim 724 and second section 741b of outer portion 740 passing through opening 774 of rim 724. In other words, the circumferential or transverse width of first section 741a of outer end portion 740 is sized such that it passes through opening 777 of the outer annular surface 768, but is larger than the openings 774 in the attachment portions 772 of rim 724 to retain spoke 722 to rim 724.

First section 741a of outer end portion 740 is also spot welded or adhesively secured to the inner surface of attachment portions 772 of rim 724 by a spot weld or adhesive 760 in a similar manner as discussed above. Of course, a fastener such as a rivet or a bolt and nut or the like can be used instead of spot weld or adhesive 760 or in conjunction therewith. Accordingly, each spoke 722 is secured within rim 724 by its outer portion 740 engaging opening 774 as well as due to the adhesive or spot weld 760 or a fastener. Of course, it will be apparent to those skilled in the art from this disclosure that the adhesive or spot weld could be eliminated if needed and/or desired.

To assist in spot welding or adhesively securing outer end portion 740 to the inner surface of rim 724, the outer end portion 740 should be a substantially flat member or bent to follow the interior contour of rim 724. In any event, the outer end portion 740 has a large attachment area for securing to the sidewall or attachment portion 724 of rim 724 so that any stress applied to rim 724 is distributed over a larger area of rim 724. In this embodiment, spoke 722 is preferably constructed of a flat sheet material that forms outer end portion 740, first center section 741 and second center portion 742. The inner end portion (not shown) which is coupled to the inner end of center portion 742 preferably has a connection assembly similar to that shown in FIG. 8a such that spoke 722 can be placed under tension.

Fifteenth Embodiment

Referring now to FIGS. 28–34, a bicycle wheel 810 with a slightly modified rim and spoke connection is illustrated in partial cross-sectional view and side elevational view. In this embodiment, the shapes of spokes 822 and rim 824 have been slightly changed. In particular, spokes 822 have been provided with holes 823 and rims 824 have been provided with holes 825 for receiving rivets 860. In addition to rivets 860, spokes 822 can be further coupled to rim 824 via adhesive or cement 861. Alternatively, rivets 860 can be eliminated to use only an adhesive or nothing at all as mentioned in some of the prior embodiments.

In view of the similarities between this embodiment and the prior embodiments of the present invention, this embodiment will not be discussed or illustrated in detail herein. Rather, the description of the previous embodiments explaining the present invention applies to this embodiment to the extent that it does not contradict the drawings and/or the description thereof. For example, the precise construction of spokes 822 can be identical to spokes 22a of the first embodiment except for the addition of holes 823 for rivets 860.

Similar to the first embodiment, each of the spokes 822 has an outer end portion or spoke head 840 which extends into the hollow portion of rim 824 via openings 874, a substantially straight center portion 842 extending inwardly from outer end portion 840 and an inner end portion 844 located radially inwardly of center portion 842 such that the inner end portion 844 is coupled to the hub in the same manner as seen in FIG. 3. Preferably, outer end portion 840, center portion 842 and inner end portion 844 are constructed as a one-piece, unitary member with a connection member or spoke nipple 846 coupled to the inner end portion 844 for connection to hub 20 as seen in the first embodiment.

Bicycle rim 824 is similar to the rims discussed above, except that it includes a plurality of holes 825 which are equally spaced around each side of the circumference of rim 824 to receive rivets 860. Bicycle rim 824 has an outer annular surface adapted to receive a tire thereon and first and second annular spoke attachment portions coupled to the outer annular surface and exending radially inwardly from the first and second annular spoke attachment portions. The first and second annular spoke attachment portions are coupled together at their inner ends by an inner annular surface. The first and second annular spoke attachment portions face in opposite directions with the spoke openings 874 formed therein and the fastener openings 825 positioned adjacent the spoke openings 874. The outer annular surface, the first and second annular spoke attachment portions and the inner annular surface are preferably integrally formed as a one-piece, unitary member with an annular hollow area formed therebetween.

Rim 824 of this embodiment is somewhat similar to rim 324 of FIGS. 15 through 18 in that the rim 824 has a bulged section 872. The exterior surfaces which form bulged section 872 are located radially inwardly of spoke openings 874, while fastener openings 825 are formed along bulged section 872. Bulged section 872 bows outwardly such that spokes 822 are bent slightly around bulged section 872 when spokes 822 are coupled between hub 20 and rim 824. In other words, bulged section 872 has an axial width which is larger than the axial width of rim 824 along said spoke openings 874. Preferably, bulged section 872 is formed by oppositely facing convex sections of the exterior surfaces of rim 824. The fastener openings 825 are formed along the convex sections of exterior surfaces of bulged section 872.

Spoke openings 874 are preferably substantially elongated, thin slot extending in a substantially circumferential direction along the first and second annular spoke attachment portions. The spoke openings 874 are preferably located at least five millimeters radially outwardly from the inner annular surface, and having a radial width in the range of about 0.5 millimeters to about 5.0 millimeters.

It will be apparent to those skilled in the art from this disclosure that wheel 810 can be either a twelve spoked wheel as in FIG. 1 or a sixteen spoked wheel as seen in FIG. 2. Of course, it will be apparent to those skilled in the art from this disclosure that wheel 810 can be either a front or rear wheel having fewer or more spokes than illustrated in FIGS. 1 or 2.

Figure 31:
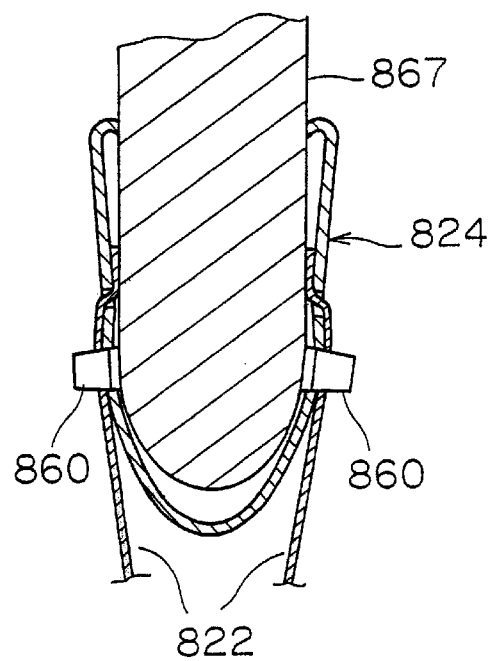
FIG. 31 is a partial, cross-sectional view of a bicycle rim and two bicycle spokes illustrated in FIGS. 28–30, with an anvil inserted into the hollow area of the rim.
Figure 32:
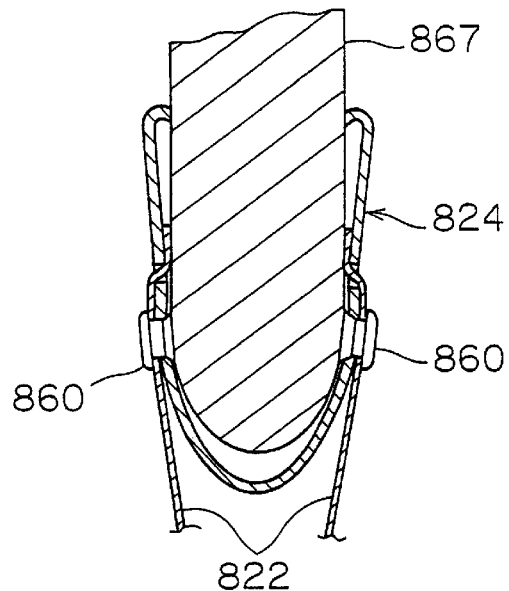
FIG. 32 is a partial, cross-sectional view of a bicycle rim and two bicycle spokes illustrated in FIGS. 28–31, with the rivets being deformed to fixedly secure the spokes to the rim.
Figure 33:
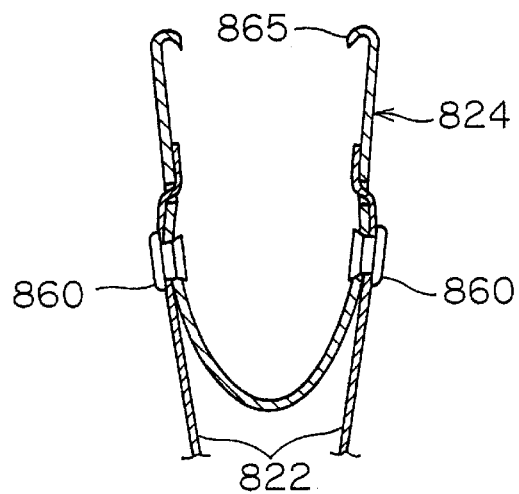
FIG. 33 is a partial, cross-sectional view of a bicycle rim and two bicycle spokes illustrated in FIGS. 28–32 in accordance with a fifteenth embodiment of the present invention.
Figure 34:
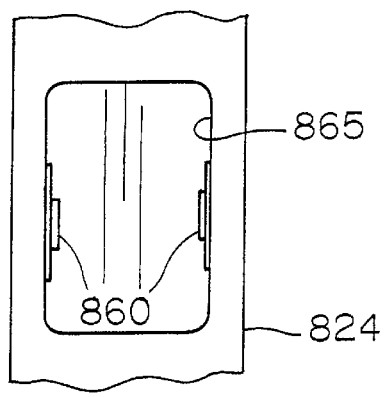
FIG. 34 is a partial, top plan view of a bicycle rim and two bicycle spokes illustrated in FIGS. 28–33 in accordance with a fifteenth embodiment of the present invention.

As seen in FIGS. 30–34, spokes 822 are fixedly secured to rim 824 using an anvil or support member 867 which is inserted through the access openings 865 formed in the upper surface of rim 824. In other words, a plurality of access openings 865 are formed in the upper surface of rim 824 for accessing the interior hollow portion of rim 824 such that rivets 860 can be inserted through the holes 823 and 825 of the spokes 822 and rim 824, respectively. Once the rivets 860 are inserted through the holes 825 and 823, the inner ends of rivets 860 are supported by anvil 867 which is inserted through access opening 865 of rim 824 as seen in FIG. 31. Next, the rivets 860 are hammered or otherwise deformed so as to form a headed portion which engages the outwardly facing surface of spokes 822 to fixedly secure spokes 822 to rim 824 as seen in FIG. 32. In other words, anvil 867 supports the rivets 860 from being pushed inwardly into the hollow area of rim 824 during the deformation of rivets 860. Once the rivets 860 are completely deformed, spokes 822 are fixedly secured to rim 824 as seen in FIGS. 33 and 34. Of course, it will be apparent to those skilled in the art from this disclosure that other types of rivets could be utilized. For example, a pop-rivet could be utilized, in which case access opening 865 and anvil 867 would not be necessary.

Sixteenth Embodiment

Figure 35:
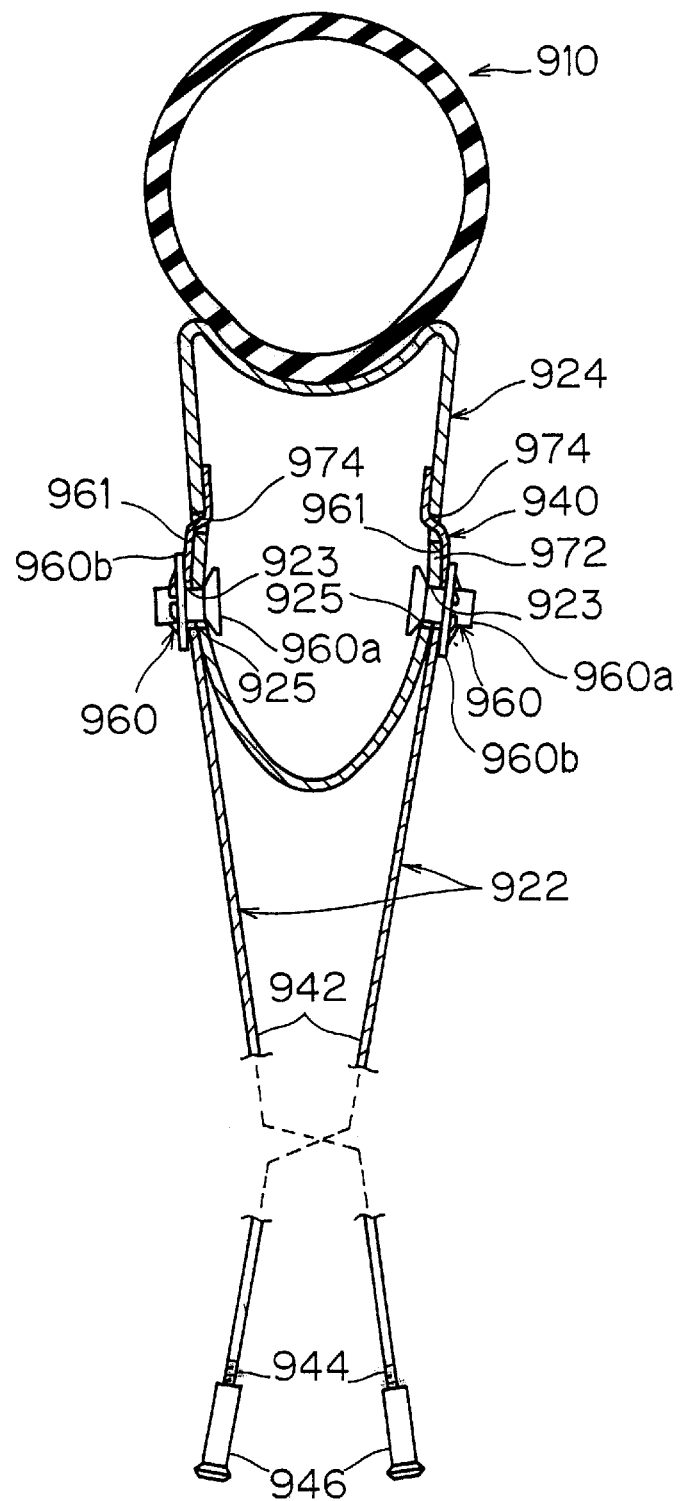
FIG. 35 is a partial, cross-sectional view of a bicycle rim and two bicycle spokes in accordance with a sixteenth embodiment of the present invention.
Figure 36:
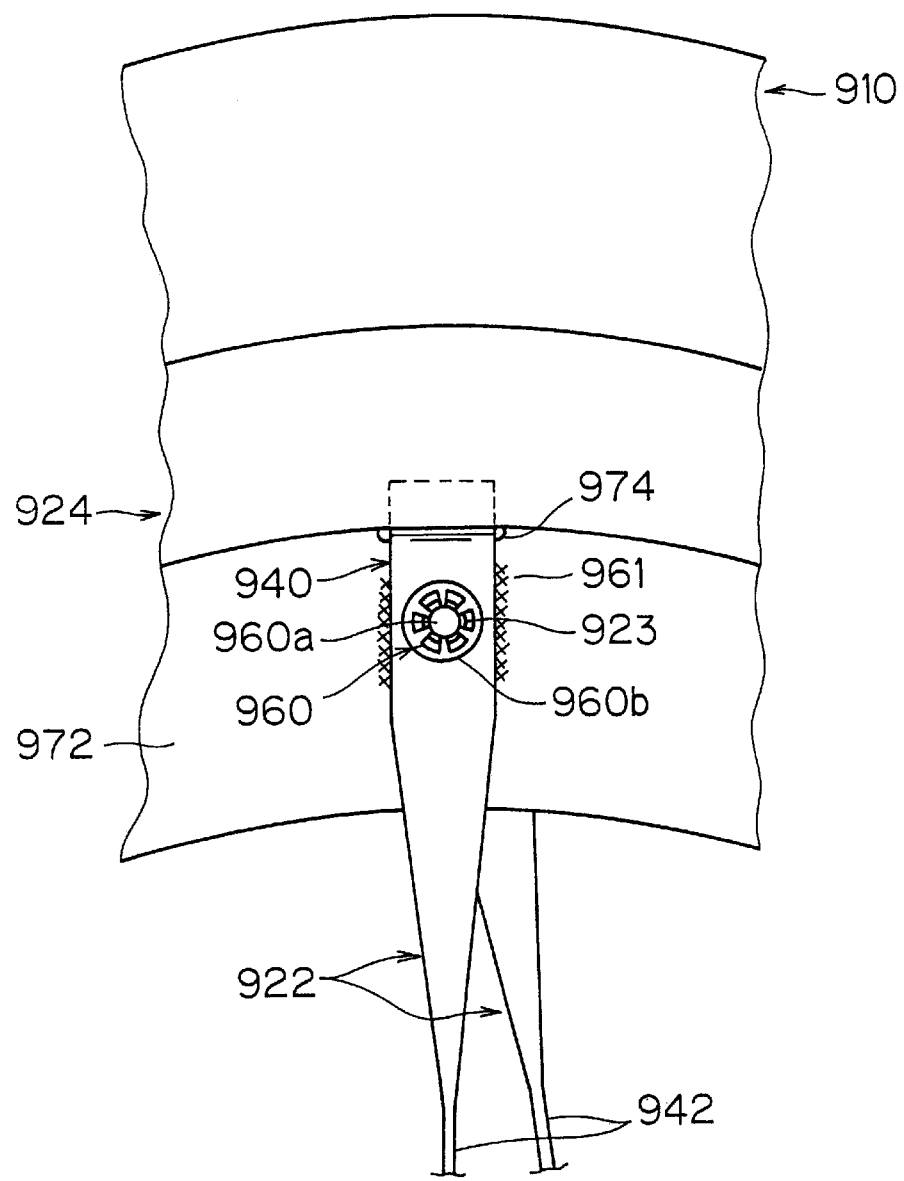
FIG. 36 is a partial, side elevational view of the bicycle rim and two bicycle spokes illustrated in FIG. 35 in accordance with the sixteenth embodiment of the present invention.
Figure 36:
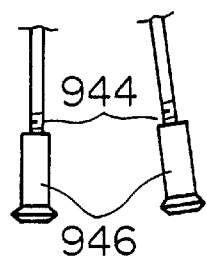

Referring now to FIGS. 35 and 36, a bicycle wheel 910 with a slightly modified rim and spoke connection is illustrated in partial cross-sectional view and side elevational view. In this embodiment, the shapes of spokes 922 and rim 924 have been slightly changed. In particular, spokes 922 have been provided with holes 923 and rims 924 have been provided with holes 925 for receiving fasteners 960. In addition to fasteners 960, spokes 922 can be further coupled to rim 924 via adhesive or cement 961. Alternatively, fasteners 960 can be eliminated to use only an adhesive or nothing at all as mentioned in some of the prior embodiments.

In view of the similarities between this embodiment and the prior embodiments of the present invention, this embodiment will not be discussed or illustrated in detail herein. Rather, the description of the previous embodiments explaining the present invention applies to this embodiment to the extent that it does not contradict the drawings and/or the description thereof. For example, the precise construction of spokes 922 can be identical to spokes 22a of the first embodiment except for the addition of holes 923 for fasteners 960.

In this embodiment, fasteners 960 each includes a pin 960a and a self-locking ring or retaining ring 960b. Specifically, pin 960a is a headed pin with a shaft portion and a head portion. The shaft portion of pin 960a is inserted through one of the holes 925 in rim 924 and through one of the holes 923 in one of the spokes 922 such that the head portion of the pin 960a abuts against the internal surface of rim 924. An anvil, like in the prior embodiment, can be utilized to hold pins 960a in place. Now, retaining ring 960b is pushed onto the shaft portion of pin 960a to fixedly secure spoke 922 to rim 924. The shaft portion of pin 960a can be smooth or can include one or more ribs or grooves for more securely fastening retaining ring 960b to the shaft portion of pin 960a.

It will be apparent to those skilled in the art from this disclosure that fastener 960 could be a nut and bolt or some other type of fastener as needed and/or desired. For example, the fastening ring 960b could be a C-shaped retaining ring for engaging a groove in the shaft portion of the pin.

Similar to the first embodiment, each of the spokes 922 has an outer end portion or spoke head 940 which extends into the hollow portion of rim 924 via openings 974, a substantially straight center portion 942 extending inwardly from outer end portion 940 and an inner end portion 944 located radially inwardly of center portion 942 such that the inner end portion 944 is coupled to the hub in the same manner as seen in FIG. 3. Preferably, outer end portion 940, center portion 942 and inner end portion 944 are constructed as a one-piece, unitary member with a connection member or spoke nipple 946 coupled to the inner end portion 944 for connection to hub 20 as seen in the first embodiment.

Rim 924 of this embodiment is somewhat similar to rim 324 of FIGS. 15 through 18 and rim 824 of FIGS. 28–34 in that the rim 924 has a bulged section 972. Bulged section 972 bows outwardly such that spokes 922 are bent slightly around bulged section 972 when spokes 922 are coupled between hub 20 and rim 924. Thus, the description of rims 324 and 824 applies to this embodiment to the extent that they do not contradict the drawings and/or the description thereof.

Rim 924 is similar to the rims discussed above, except that it includes a plurality of holes 925 which are equally spaced around each side of the circumference of rim 924 to receive fasteners 960. Moreover, it will be apparent to those skilled in the art from this disclosure that wheel 910 can be either a twelve spoked wheel as in FIG. 1 or a sixteen spoked wheel as seen in FIG. 2. Of course, it will be apparent to those skilled in the art from this disclosure that wheel 910 can be either a front or rear wheel having fewer or more spokes than illustrated in FIGS. 1 or 2.

While particular embodiments have been chosen to illustrate the present invention, it will be understood by those skilled in the art that various changes and modifications can be made herein without departing from the scope of the invention as defined in the appended claims.

What is claimed is:

1. A spoked rim assembly, comprising:
   an annular hollow rim having an outer annular surface adapted to receive a tire thereon, and a spoke attachment portion with an opening spaced from an innermost radial edge of said hollow rim;
   an inwardly extending spoke having an outer end portion at least partially received within said opening, a center portion located radially inwardly of said outer end portion, and an inner end portion located radially inwardly of said center portion, said outer end portion of said spoke having a first section offset from a second section to retain said outer end portion within said opening of said spoke attachment portion of said rim; and
   a fastener coupled between said rim and said spoke.

2. A spoked rim assembly according to claim 1, wherein said fastener is a rivet which fixedly secures said spoke to said rim.

3. A spoked rim assembly according to claim 1, wherein said fastener includes a headed pin and locking member.

4. A spoked rim assembly according to claim 3, wherein said locking member is a retaining ring which engages a shaft portion of said headed pin.

5. A spoked rim assembly according to claim 1, wherein said spoke is further fastened to said rim via an adhesive.

6. A spoked rim assembly according to claim 1, wherein said first section of said spoke has a first surface facing in a first direction to engage an inner surface of said rim, and said second section of said spoke has a second surface facing in a second direction to engage an outer surface of said spoke attachment portion.

7. A spoked rim assembly according to claim 1, wherein said outer end portion of said spoke has an elongated cross-section, and said opening of said rim is an elongated slot.

8. A spoked rim assembly according to claim 7, wherein said elongated cross-section of said spoke is substantially identical or smaller in cross-section than said first section of said spoke to allow said first section to pass therethrough.

9. A spoked rim assembly according to claim 1, wherein said inner end portion of said spoke has threads thereon.

10. A spoked rim assembly according to claim 1, wherein said inner end portion of said spoke includes an abutment for engaging a part of a hub.

11. A spoked rim assembly according to claim 1, wherein said rim has a plurality of said openings in said spoke attachment portion, with a plurality of said spokes coupled thereto via a plurality of said fasteners.

12. A spoked rim assembly according to claim 11, wherein said inner end portions of said spokes include abutments for engaging a part of a hub.

13. A spoked rim assembly according to claim 12, wherein said abutments are part of spoke nipples which are adjustably coupled to said inner end portions of said spokes for longitudinal adjustment of the spokes.

14. A spoked rim assembly according to claim 11, wherein said spoke attachment portion of said rim has at least twelve of said openings, with at least six of said openings located on a first side of said rim and at least six of said openings located on a second side of said rim.

15. A spoked rim assembly according to claim 11, wherein said spoke attachment portion of rim has at least sixteen of said openings, with at least eight of said openings located on a first side of said rim and at least eight of said openings located on a second side of said rim.

16. A spoked rim assembly according to claim 11, wherein said spoke attachment portion is formed by a pair of oppositely facing sidewalls of said rim with said openings formed therein.

17. A spoked rim assembly according to claim 16, wherein
said second sections of said spokes are fastened to said sidewalls of said rim via said fasteners.

18. A spoked rim assembly according to claim 11, wherein
said fasteners are rivets fixedly securing said spokes to said rim.

19. A spoked rim assembly according to claim 18, wherein
said spokes are further coupled to said rim via an adhesive.

20. A spoked rim assembly according to claim 11, wherein
said fasteners include a headed pin and locking member.

21. A spoked rim assembly according to claim 20, wherein
each said locking member is a retaining ring which engages a shaft portion of one of said headed pins.

22. A spoked rim assembly according to claim 21, wherein
said spokes are further coupled to said rim via an adhesive.

23. A spoked rim assembly, comprising:
an annular rim having an outer annular surface adapted to receive a tire thereon, a spoke attachment portion with a plurality of openings and an annular bulged section located radially inwardly of said openings, said spoke attachment portion being formed by a pair of oppositely facing sidewalls of said rim with said openings being formed therein, said bulged section having a width which is larger than the width of said rim along said openings;
a plurality of inwardly extending spokes each having an outer end portion at least partially received within one of said openings, a center portion located radially inwardly of said outer end portion, and an inner end portion located radially inwardly of said center portion, said outer end portions of said spokes each having a first section offset from a second section to retain said outer end portion within said openings of said spoke attachment portion of said rim; and
a plurality of fasteners coupled between said rim and said spokes, said second sections of said spokes being fastened to said sidewalls of said rim via said fasteners.

24. A spoked rim assembly according to claim 23, wherein
said bulged section has a pair of oppositely facing convex outer surfaces which form part of said sidewalls of said rim.

25. A spoked rim assembly according to claim 24, wherein
said second sections of said spokes are fastened to said bulged section of said rim via said fasteners.

26. A bicycle wheel, comprising:
an annular hollow rim having an outer annular surface adapted to receive a tire thereon, and a spoke attachment portion with an opening spaced from an innermost radial edge of said hollow rim;
an inwardly extending spoke having an outer end portion received within said opening, a center portion located radially inwardly of said outer end portion, and an inner end portion located radially inwardly of said center portion, said outer end portion of said spoke having a first section offset from a second section to retain said outer end portion within said opening of said spoke attachment portion of said rim;
a fastener coupled between said rim and said spoke; and
a central hub having a spoke attachment part being coupled to said inner end portion of said spoke.

27. A bicycle wheel according to claim 26, wherein
said fastener is a rivet which fixedly secures said spoke to said rim.

28. A bicycle wheel according to claim 26, wherein
said fastener includes a headed pin and locking member.

29. A bicycle wheel according to claim 28, wherein
said locking member is a retaining ring which engages a shaft portion of said headed pin.

30. A bicycle wheel according to claim 26, wherein
said spoke is further fastened to said rim via an adhesive.

31. A bicycle wheel according to claim 26, wherein
said outer end portion of said spoke has an elongated cross-section, and said opening of said rim is an elongated slot.

32. A bicycle wheel according to claim 31, wherein
said elongated cross-section of said spoke is substantially identical or smaller in cross-section than said first section of said spoke to allow said first section to pass therethrough.

33. A bicycle wheel according to claim 26, wherein
said rim has a plurality of said openings in said spoke attachment portion, with a plurality of said spokes coupled thereto via a plurality of said fasteners.

34. A bicycle wheel according to claim 33, wherein
said inner end portions of said spokes include abutments for engaging a part of said hub.

35. A bicycle wheel according to claim 33, wherein
said inner end portions of said spokes are adjustably coupled to said hub for longitudinal adjustment of said spokes.

36. A bicycle wheel according to claim 35, wherein
said hub has a pair of flanges at each end with a plurality of bores having said inner end portions of said spokes located therein, said inner end portions of said spokes are threaded with spoke nipples threaded thereon for longitudinal adjustment of the spokes.

37. A bicycle wheel according to claim 33, wherein
said spoke attachment portion of said rim has twelve to sixteen of said openings, with six to eight of said openings located on a first side of said rim and six to eight of said openings located on a second side of said rim.

38. A bicycle wheel, comprising;
an annular rim having an outer annular surface adapted to receive a tire thereon, a spoke attachment portion with a plurality of openings and an annular bugled section located radially inwardly of said openings, said bulged section having a width which is larger than the width of said rim along said openings;
a plurality of inwardly extending spokes each having an outer end portion received within one of said openings, a center portion located radially inwardly of said outer end portion, and an inner end portion located radially inwardly of said center portion, said outer end portions of said spokes each having a first section offset from a second section to retain said outer end portions within said openings of said spoke attachment portion of said rim;
a plurality of fasteners coupled between said rim and said spokes; and
a central hub having a spoke attachment part being coupled to said inner end portions of said spokes.

39. A bicycle wheel according to claim 38, wherein
said bulged section has a pair of oppositely facing convex outer surfaces.
40. A bicycle wheel according to claim 39, wherein
said spoke attachment portion is formed by a pair of oppositely facing sidewalls of said rim, and said second sections of said spokes are permanently fastened to said bulged section by said fasteners.
41. A bicycle wheel according to claim 40, wherein
said spokes are further coupled to said rim via an adhesive.
42. A bicycle wheel according to claim 40, wherein
said fasteners are rivets which fixedly secure said spokes to said rim.
43. A bicycle wheel according to claim 40, wherein
said fasteners include a headed pin and locking member.
44. A bicycle wheel according to claim 43, wherein
each said locking member is a retaining ring which engages a shaft portion of one of said headed pins.
45. A bicycle wheel according to claim 44, wherein
said spoke is further fastened to said rim via an adhesive.
46. A bicycle rim, comprising:
an outer annular surface adapted to receive a tire thereon and having a plurality of access openings formed therein;
first and second annular spoke attachment portions coupled to said outer annular surface and located radially inwardly thereof, said first and second annular spoke attachment portions facing in opposite directions with a plurality of spoke openings formed therein and a plurality of fastener openings positioned adjacent said spoke openings, said spoke openings being adapted to receive outer ends of spokes therein; and
an inner annular surface coupling said first and second annular spoke attachment portions together, said outer annular surface, said first and second annular spoke attachment portions and said inner annular surface being integrally formed as a one-piece, unitary member with an annular hollow area,
each of said plurality of spoke openings being a substantially elongated, thin slot extending in a substantially circumferential direction along said first and second annular spoke attachment portions, said plurality of spoke openings being spaced at least five millimeters radially outwardly from said inner annular surface, and having a radial width in the range of about 0.5 millimeters to about 5.0 millimeters.
47. A bicycle rim according to claim 46, wherein
said annular hollow area is located between said first and second annular spoke attachment portions.
48. A bicycle rim according to claim 47, wherein
said first and second annular spoke attachment portions have first and second exterior surfaces facing in opposite directions, respectively, said first exterior surface having a first set of said plurality of spoke openings formed therethrough and a first set of said plurality of fastener openings formed therethrough, said second exterior surface having a second set of said plurality of spoke openings formed therethrough and a second set of said plurality of fastener openings formed therethrough.
49. A bicycle rim according to claim 46, wherein
said fastener openings are located radially inwardly of said spoke openings.
50. A bicycle rim, comprising:
an outer annular surface adapted to receive a tire thereon and having a plurality of access openings formed therein;
first and second annular spoke attachment portions coupled to said outer annular surface and located radially inwardly thereof, said first and second annular spoke attachment portions facing in opposite directions with a plurality of spoke openings formed therein and a plurality of fastener openings positioned adjacent said spoke openings, said first and second annular spoke attachment portions having first and second exterior surfaces facing in opposite directions, respectively, said first exterior surface having a first set of said plurality of spoke openings formed therethrough and a first set of said plurality of fastener openings formed therethrough, said second exterior surface having a second set of said plurality of spoke openings formed therethrough and a second set of said plurality of fastener openings formed therethrough, said first and second exterior surfaces forming an annular bulged section located radially inwardly of said spoke openings, said bulged section having an axial width which is larger than the axial width of said rim along said openings; and
an inner annular surface coupling said first and second annular spoke attachment portions together, said outer annular surface, said first and second annular spoke attachment portions and said inner annular surface being integrally formed as a one-piece, unitary member with an annular hollow area, said annular hollow area being located between said first and second annular spoke attachment portions,
each of said plurality of spoke openings being a substantially elongated, thin slot extending in a substantially circumferential direction along said first and second annular spoke attachment portions, said plurality of spoke openings being located at least five millimeters radially outwardly from said inner annular surface, and having a radial width in the range of about 0.5 millimeters to about 5.0 millimeters.
51. A bicycle rim according to claim 50, wherein
said bulged section is formed by oppositely facing convex sections of said first and second exterior surfaces.
52. A bicycle rim according to claim 51, wherein
said fastener openings are formed along said convex sections of said first and second exterior surfaces.
53. A spoked rim assembly, comprising:
an annular rim having an outer annular surface adapted to receive a tire thereon, a spoke attachment portion with an opening and a bulged section located radially inwardly of said opening, said bulged section having a width which is larger than the width of said rim along said opening;
an inwardly extending spoke having an outer end portion at least partially received within said opening, a center portion located radially inwardly of said outer end portion, and an inner end portion located radially inwardly of said center portion, said outer end portion of said spoke having a first section offset from a second section to retain said outer end portion within said opening of said spoke attachment portion of said rim; and
a fastener coupled between said rim and said spoke.
54. A bicycle wheel, comprising:
an annular rim having an outer annular surface adapted to receive a tire thereon, a spoke attachment portion with an opening and a bulged section located radially inwardly of said opening, said bulged section having a width which is larger than the width of said rim along said opening;

an inwardly extending spoke having an outer end portion received within said opening, a center portion located radially inwardly of said outer end portion, and an inner end portion located radially inwardly of said center portion, said outer end portion of said spoke having a first section offset from a second section to retain said outer end portion within said opening of said spoke attachment portion of said rim;

a fastener coupled between said rim and said spoke; and a central hub having a spoke attachment part being coupled to said inner end portion of said spoke.

55. A bicycle rim, comprising:

an outer annular surface adapted to receive a tire thereon and having a plurality of access openings formed therein;

first and second annular spoke attachment portions coupled to said outer annular surface and located radially inwardly thereof, said first and second spoke attachment portions facing in opposite directions with a plurality of spoke openings formed therein and a plurality of fastener openings positioned adjacent said spoke openings, said first and second annular spoke attachment portions forming an annular bulged section located radially inwardly of said spoke openings, said bulged section having an axial width which is larger than the axial width of said rim along said openings; and an inner annular surface coupling said first and second annular spoke attachment portions together, said outer annular surface, said first and second annular spoke attachment portions and said inner annular surface being integrally formed as a one-piece, unitary member with an annular hollow area, each of said plurality of spoke openings being a substantially elongated, thin slot extending in a substantially circumferential direction along said first and second annular spoke attachment portions, said plurality of spoke openings being located at least five millimeters radially outwardly from said inner annular surface, and having a radial width in the range of about 0.5 millimeters to about 5.0 millimeters.

* * * * *